United States Patent
Song et al.

(10) Patent No.: US 9,538,314 B2
(45) Date of Patent: Jan. 3, 2017

(54) NEAR FIELD COMMUNICATION DEVICE, ELECTRONIC SYSTEM HAVING THE SAME AND METHOD OF CONTROLLING POWER IN NEAR FIELD COMMUNICATION DEVICE

(71) Applicant: SAMSUNG ELECTRONICS CO., LTD., Suwon-si, Gyeonggi-do (KR)

(72) Inventors: Il-Jong Song, Suwon-si (KR); Jun-Ho Kim, Seongnam-si (KR); Chol-Su Yoon, Yongin-si (KR); Byeong-Hoon Lee, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 159 days.

(21) Appl. No.: 14/482,034

(22) Filed: Sep. 10, 2014

(65) Prior Publication Data
US 2015/0079903 A1 Mar. 19, 2015

(30) Foreign Application Priority Data
Sep. 16, 2013 (KR) .................. 10-2013-0111325

(51) Int. Cl.
| | | |
|---|---|---|
| H04W 4/00 | (2009.01) | |
| H04B 5/00 | (2006.01) | |
| G06K 7/10 | (2006.01) | |
| H04W 52/02 | (2009.01) | |

(52) U.S. Cl.
CPC ........... *H04W 4/008* (2013.01); *G06K 7/10217* (2013.01); *H04B 5/0075* (2013.01); *H04W 52/0241* (2013.01); *H04W 52/0245* (2013.01); *Y02B 60/50* (2013.01)

(58) Field of Classification Search
CPC ............ H04B 5/00–5/06; H04W 52/00–52/60
See application file for complete search history.

(56) References Cited

U.S. PATENT DOCUMENTS

| | | | | |
|---|---|---|---|---|
| 5,013,898 A | * | 5/1991 | Glasspool | G06K 19/0723 235/449 |
| 5,703,573 A | * | 12/1997 | Fujimoto | G01S 13/82 340/10.3 |
| 6,905,074 B2 | | 6/2005 | Charrat | |
| 6,960,985 B2 | * | 11/2005 | Wuidart | G06K 7/10217 340/10.3 |
| 7,688,270 B2 | | 3/2010 | Tsushima | |
| 8,314,702 B2 | | 11/2012 | Garrett et al. | |
| 8,798,533 B2 | * | 8/2014 | Wuidart | G06K 19/0701 340/572.4 |

(Continued)

FOREIGN PATENT DOCUMENTS

| | | |
|---|---|---|
| JP | 2006-279813 | 10/2006 |
| KR | 1020070084860 | 8/2007 |
| KR | 100791622 | 12/2007 |

*Primary Examiner* — Gennadiy Tsvey
(74) *Attorney, Agent, or Firm* — F. Chau & Associates, LLC

(57) ABSTRACT

A near field communication (NFC) device includes a resonance unit and an NFC chip. The resonance unit emits an electromagnetic wave to communicate data with an external NFC card in a reader mode. The NFC chip estimates a distance between the resonance unit and the external NFC card based on an antenna voltage generated by the resonance unit while the resonance unit emits the electromagnetic wave, and adjusts a magnitude of the electromagnetic wave based on the estimated distance.

14 Claims, 13 Drawing Sheets

(56) References Cited

U.S. PATENT DOCUMENTS

| | | | |
|---|---|---|---|
| 2004/0256460 A1* | 12/2004 | Charrat | G06K 7/0008 |
| | | | 235/451 |
| 2007/0046430 A1 | 3/2007 | Yamazaki et al. | |
| 2009/0309704 A1 | 12/2009 | Chang et al. | |
| 2010/0253477 A1 | 10/2010 | Seppa et al. | |
| 2011/0115663 A1* | 5/2011 | Bogaerts | H03M 1/123 |
| | | | 341/164 |
| 2012/0007683 A1 | 1/2012 | Song et al. | |
| 2012/0032522 A1* | 2/2012 | Schatz | H02J 5/005 |
| | | | 307/104 |
| 2012/0214411 A1 | 8/2012 | Levy | |

* cited by examiner

NEAR FIELD COMMUNICATION DEVICE, ELECTRONIC SYSTEM HAVING THE SAME AND METHOD OF CONTROLLING POWER IN NEAR FIELD COMMUNICATION DEVICE

CROSS-REFERENCE TO RELATED APPLICATION(S)

This application claims priority under 35 USC §119 to Korean Patent Application No. 10-2013-0111325, filed on Sep. 16, 2013, the disclosure of which is herein incorporated by reference in its entirety.

TECHNICAL FIELD

Exemplary embodiments of the present invention relate to a wireless communication technology, and more particularly, to a near field communication (NFC) device, an electronic system including the NFC device, and a method of controlling power in the NFC device.

DISCUSSION OF THE RELATED ART

Near field communication (NFC) technology is a short-range wireless communication technology. As NFC technology has been developed, NFC devices have been more commonly employed in mobile devices. When included in a mobile device, an NFC device consumes power of the mobile device, which is typically provided via a battery of the mobile device.

SUMMARY

Exemplary embodiments of the present invention provide a near field communication (NFC) device that reduces power consumption.

Exemplary embodiments of the present invention provide an electronic system including the NFC device.

Exemplary embodiments of the present invention provide a method of controlling power in an NFC device that reduces power consumption.

According to an exemplary embodiment of the present invention, a near field communication (NFC) device includes a resonance unit and an NFC chip. The resonance unit emits an electromagnetic wave to communicate (e.g., transmit and receive) data with an external NFC card in a reader mode. The NFC chip estimates a distance to the external NFC card based on an antenna voltage generated by the resonance unit while the resonance unit emits the electromagnetic wave, and adjusts a magnitude of the electromagnetic wave based on the estimated distance.

In an exemplary embodiment, the resonance unit may generate the antenna voltage through a mutual induction with the external NFC card while the resonance unit emits the electromagnetic wave.

In an exemplary embodiment, the NFC chip may provide an output current to the resonance unit, the resonance unit may emit the electromagnetic wave having a magnitude corresponding to the output current, and the NFC chip may measure the antenna voltage while the resonance unit emits the electromagnetic wave and adjust a magnitude of the output current based on a magnitude of the antenna voltage.

In an exemplary embodiment, the NFC chip may decrease the magnitude of the output current when the magnitude of the antenna voltage decreases, and increase the magnitude of the output current when the magnitude of the antenna voltage increases.

In an exemplary embodiment, the NFC chip may measure the antenna voltage while the NFC chip periodically provides the output current to the resonance unit, and detect whether an NFC card is near the resonance unit based on a decrease amount of the antenna voltage.

In an exemplary embodiment, the NFC chip may include a transmit unit configured to provide the output current having a magnitude corresponding to a power control signal to the resonance unit through a transmission electrode, a distance estimation unit configured to receive the antenna voltage from the resonance unit through a power electrode, and to convert the antenna voltage into a digital value, and a central processing unit (CPU) configured to detect whether an NFC card exists around the resonance unit based on the digital value, and to generate the power control signal based on the digital value when the NFC card is detected near the resonance unit.

In an exemplary embodiment, the transmit unit may periodically provide the output current to the resonance unit through the transmission electrode, the distance estimation unit may convert the antenna voltage received from the resonance unit through the power electrode to the digital value while the resonance unit emits the electromagnetic wave, and the CPU may determine that the NFC card is detected near the resonance unit when a voltage corresponding to the digital value is lower than a standard voltage by a threshold voltage or more.

In an exemplary embodiment, when the NFC card is detected near the resonance unit, the transmit unit may continuously provide the output current to the resonance unit, the distance estimation unit may periodically convert the antenna voltage to the digital value, and the CPU may adjust a magnitude of the power control signal based on the digital value.

In an exemplary embodiment, the transmit unit may include a voltage generation unit configured to generate a transmission supply voltage based on the power control signal, a pull-up transistor coupled between the transmission supply voltage and the transmission electrode, a pull-down transistor coupled between a ground voltage and the transmission electrode, and a driving unit configured to turn on one of the pull-up transistor and the pull-down transistor based on output data in the reader mode.

In an exemplary embodiment, the CPU may decrease the power control signal when the digital value decreases, and increase the power control signal when the digital value increases, and the voltage generation unit may decrease the transmission supply voltage when the power control signal decreases, and increase the transmission supply voltage when the power control signal increases.

In an exemplary embodiment, the transmit unit may include first through n-th pull-up transistors coupled in parallel between a transmission supply voltage and the transmission electrode, first through n-th pull-down transistors coupled in parallel between a ground voltage and the transmission electrode, and a driving unit configured to select k pull-up transistors and k pull-down transistors from among the first through n-th pull-up transistors and the first through n-th pull-down transistors based on the power control signal, and turning off the first through n-th pull-down transistors and the unselected (n-k) pull-up transistors and turning on the selected k pull-up transistors, or turning off the first through n-th pull-up transistors and the unselected (n-k) pull-down transistors and turning on the selected k pull-down transistors based on output data. Here, n is an integer equal to or greater than two, and k is a positive integer equal to or less than n.

In an exemplary embodiment, the CPU may decrease the power control signal when the digital value decreases, and increase the power control signal when the digital value increases, and the driving unit may decrease a number of the selected pull-up transistors and a number of the selected pull-down transistors when the power control signal decreases, and increase the number of the selected pull-up transistors and the number of the selected pull-down transistors when the power control signal increases.

In an exemplary embodiment, the transmit unit may include a voltage generation unit configured to generate a transmission supply voltage based on a first power control signal, first through n-th pull-up transistors coupled in parallel between the transmission supply voltage and the transmission electrode, first through n-th pull-down transistors coupled in parallel between a ground voltage and the transmission electrode, and a driving unit configured to select k pull-up transistors and k pull-down transistors from among the first through n-th pull-up transistors and the first through n-th pull-down transistors based on a second power control signal, and turning off the first through n-th pull-down transistors and the unselected (n-k) pull-up transistors and turning on the selected k pull-up transistors, or turning off the first through n-th pull-up transistors and the unselected (n-k) pull-down transistors and turning on the selected k pull-down transistors based on output data.

In an exemplary embodiment, the CPU may decrease at least one of the first power control signal and the second power control signal when the digital value decreases, and increase at least one of the first power control signal and the second power control signal when the digital value increases, the voltage generation unit may decrease the transmission supply voltage when the first power control signal decreases, and increase the transmission supply voltage when the first power control signal increases, and the driving unit may decrease a number of the selected pull-up transistors and a number of the selected pull-down transistors when the second power control signal decreases, and increase the number of the selected pull-up transistors and the number of the selected pull-down transistors when the second power control signal increases.

In an exemplary embodiment, the distance estimation unit may include a sensing unit configured to generate a direct voltage proportional to the magnitude of the antenna voltage and a gain signal, and an analog-to-digital conversion unit configured to generate the digital value by performing an analog-to-digital conversion on the direct voltage.

In an exemplary embodiment, the CPU may provide the gain signal having a first value to the sensing unit in the reader mode, and provide the gain signal having a second value greater than the first value to the sensing unit in a card mode.

In an exemplary embodiment, the sensing unit may include a rectification circuit coupled between the power electrode and a first node, and rectifying the antenna voltage received through the power electrode, a resistor coupled between the first node and a second node, and a variable resistor coupled between the second node and a ground voltage, and having a resistance corresponding to the gain signal, wherein the sensing unit outputs the direct voltage through the second node.

In an exemplary embodiment, the sensing unit may include a rectification circuit coupled between the power electrode and a first node, and rectifying the antenna voltage received through the power electrode, and a variable current source coupled between the first node and a ground voltage, and generating a current having a magnitude corresponding to the gain signal, wherein the sensing unit outputs the direct voltage through the first node.

In an exemplary embodiment, the analog-to-digital conversion unit may include a counting unit configured to generate a counting value by performing an up-counting operation, a scanning voltage generation unit configured to generate a scanning voltage sequentially increasing based on the counting value, a comparator configured to output a comparison signal having a first logic level when the direct voltage is greater than the scanning voltage and a second logic level when the direct voltage is equal to or smaller than the scanning voltage, and a latch unit configured to store the counting value as the digital value in response to a transition of the comparison signal.

In an exemplary embodiment, the scanning voltage generation unit may include a reference voltage generator configured to generate a reference voltage, a resistor coupled between the reference voltage generator and a first node, and a variable resistor coupled between the first node and a ground voltage, and having a resistance corresponding to the counting value, wherein the scanning voltage generation unit outputs the scanning voltage through the first node.

According to an exemplary embodiment of the present invention, in a method of controlling power in an NFC device including a resonance unit that emits an electromagnetic wave to communicate (e.g., transmit and receive) data and an NFC chip, whether an NFC card is near the NFC device is detected, and when the NFC card is detected near the NFC device, a distance to the NFC card is estimated based on an antenna voltage generated by the resonance unit while the resonance unit continuously emits the electromagnetic wave to the NFC card, and a magnitude of the electromagnetic wave is adjusted based on the estimated distance.

In an exemplary embodiment, when the NFC card is detected near the NFC device, an output current may be continuously provided to the resonance unit, the electromagnetic wave having a magnitude corresponding to the output current is emitted, the antenna voltage is generated through a mutual induction with the NFC card, and the magnitude of the output current is decreased when the magnitude of the antenna voltage decreases, and the magnitude of the output current is increased when the magnitude of the antenna voltage increases.

According to an exemplary embodiment of the present invention, an electronic system includes an NFC device, a memory device, and an application processor. The NFC device communicates with an external device through NFC. The memory device stores output data and input data. The application processor controls operations of the NFC device and the memory device. The NFC device includes a resonance unit configured to emit an electromagnetic wave to transmit the output data to the external device and to receive the input data from the external device in a reader mode, and an NFC chip configured to estimate a distance to the external device based on an antenna voltage generated by the resonance unit while the resonance unit emits the electromagnetic wave, and configured to adjust a magnitude of the electromagnetic wave based on the estimated distance.

In an exemplary embodiment, the resonance unit may generate the antenna voltage through a mutual induction with the external device while the resonance unit emits the electromagnetic wave.

In an exemplary embodiment, the NFC chip may provide an output current to the resonance unit, the resonance unit may emit the electromagnetic wave having a magnitude corresponding to the output current, and the NFC chip may measure the antenna voltage while the resonance unit emits the electromagnetic wave, decrease the magnitude of the output current when the magnitude of the antenna voltage decreases, and increase the magnitude of the output current when the magnitude of the antenna voltage increases.

According to an exemplary embodiment of the present invention, a method of controlling power in a near field communication (NFC) device includes detecting whether an NFC card is near the NFC device, estimating a distance between the NFC device and the NFC card based on an antenna voltage generated by a resonance unit of the NFC device, wherein the antenna voltage is generated while the resonance unit continuously emits an electromagnetic wave to the NFC card while the NFC card is detected as being near the NFC device, and adjusting a magnitude of the electromagnetic wave based on the estimated distance while the NFC card is detected as being near the NFC device.

According to an exemplary embodiment of the present invention, a method of controlling power in a near field communication (NFC) device includes alternately operating in a reader mode that detects whether an external NFC card is near the NFC device, and a card mode that detects whether an external NFC reader is near the NFC device. Operating in the reader mode includes providing an output current from a transmit unit of the NFC device to a resonance unit of the NFC device, emitting an electromagnetic wave by the resonance unit to the external NFC card, wherein the electromagnetic wave corresponds to the output current, estimating a distance between the NFC device and the external NFC card based on an antenna voltage generated by the resonance unit while the resonance unit emits the electromagnetic wave, and adjusting a magnitude of the electromagnetic wave based on the estimated distance. Operating in the card mode includes turning off the transmit unit of the NFC device.

BRIEF DESCRIPTION OF THE DRAWINGS

The above and other features of the present invention will become more apparent by describing in detail exemplary embodiments thereof with reference to the accompanying drawings, in which:

FIG. 10 is a block diagram illustrating an example of a transmit unit included in the NFC device of FIG. 2 according to an exemplary embodiment of the present invention.

DETAILED DESCRIPTION OF THE EXEMPLARY EMBODIMENTS

Figure 1:
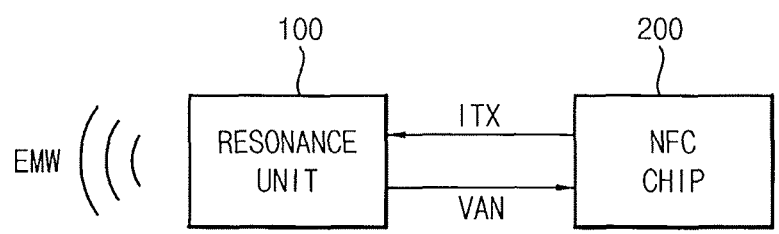
FIG. 1 is a block diagram illustrating a near field communication (NFC) device according to an exemplary embodiment of the present invention.

Exemplary embodiments of the present invention will be described more fully hereinafter with reference to the accompanying drawings. Like reference numerals may refer to like elements throughout the accompanying drawings.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept.

It will be understood that when an element is referred to as being "connected" or "coupled" to another element, it can be directly connected or coupled to the other element, or intervening elements may be present.

FIG. 1 is a block diagram illustrating a near field communication (NFC) device according to an exemplary embodiment of the present invention.

The NFC device 10 illustrated in FIG. 1 communicates with an external device through an NFC scheme. In exemplary embodiments, the NFC device 10 may perform an operation of detecting whether an NFC card is near the NFC device 10, and alternately, an operation of detecting whether an NFC reader is near the NFC device 10.

When the NFC device 10 detects an NFC reader near the NFC device 10, the NFC device 10 may operate in a card mode, in which the NFC device 10 operates as a card. In the card mode, the NFC device 10 may communicate data (e.g., transmit and receive data) with the NFC reader using an electromagnetic wave EMW emitted from the NFC reader.

When the NFC device 10 detects an NFC card near the NFC device 10, the NFC device 10 may operate in a reader mode, in which the NFC device 10 operates as a reader. In the reader mode, the NFC device 10 may emit an electromagnetic wave EMW to communicate data with the NFC card.

Referring to FIG. 1, the NFC device 10 includes a resonance unit 100 and an NFC chip 200.

The resonance unit 100 may include a resonance circuit that includes an antenna having an inductance component and a resonance capacitor.

In the reader mode, the resonance unit 100 emits the electromagnetic wave EMW to communicate data with the NFC card. Since the NFC card includes a resonance circuit that includes an antenna having an inductance component and a resonance capacitor, a mutual induction may occur between the resonance unit 100 and the NFC card, which is located near the resonance unit 100, while the resonance unit 100 emits the electromagnetic wave EMW. Therefore, an antenna voltage VAN may be generated at the resonance circuit of the resonance unit 100 through the mutual induction with the NFC card.

The NFC chip 200 estimates a distance from the NFC device 10 to the NFC card based on the antenna voltage VAN generated by the resonance unit 100 while the resonance unit 100 emits the electromagnetic wave EMW, and adjusts a magnitude of the electromagnetic wave EMW by controlling the resonance unit 100 based on the estimated distance. For example, the NFC chip 200 may control the resonance unit 100 to increase the magnitude of the electromagnetic wave EMW emitted from the resonance unit 100 when the estimated distance increases, and may control the resonance unit 100 to decrease the magnitude of the electromagnetic wave EMW emitted from the resonance unit 100 when the estimated distance decreases. That is, the NFC chip 200 may control the resonance unit 100 to increase the magnitude of the electromagnetic wave EMW emitted from the resonance unit 100 in response to the estimated distance increasing, and may control the resonance unit 100 to decrease the magnitude of the electromagnetic wave EMW emitted from the resonance unit 100 in response to the estimated distance decreasing.

In exemplary embodiments, in the reader mode, the NFC chip 200 may provide an output current ITX to the resonance unit 100, and the resonance unit 100 may emit the electromagnetic wave EMW having a magnitude corresponding to the output current ITX to communicate data with the NFC card. The NFC chip 200 may measure the antenna voltage VAN generated by the resonance unit 100 while the resonance unit 100 emits the electromagnetic wave EMW, and adjust a magnitude of the output current ITX, which is provided to the resonance unit 100, based on a magnitude of the antenna voltage VAN.

When the distance between the NFC device 10 and the NFC card is relatively small, a relatively strong mutual induction may occur between the resonance unit 100 and the NFC card such that the antenna voltage VAN decreases. When the distance between the NFC device 10 and the NFC card is relatively large, a relatively weak mutual induction may occur between the resonance unit 100 and the NFC card such that the antenna voltage VAN increases. Therefore, the NFC chip 200 may decrease the magnitude of the output current ITX, which is provided to the resonance unit 100, when the magnitude of the antenna voltage VAN decreases, and may increase the magnitude of the output current ITX, which is provided to the resonance unit 100, when the magnitude of the antenna voltage VAN increases. That is, the NFC chip 200 may decrease the magnitude of the output current ITX in response to the magnitude of the antenna voltage VAN decreasing, and may increase the magnitude of the output current ITX in response to the magnitude of the antenna voltage VAN increasing.

As described above, in the reader mode, the NFC device 10 may adjust the magnitude of the electromagnetic wave EMW, which is emitted from the NFC device 10, based on the distance between the NFC device 10 and the NFC card. As a result, power consumption of the NFC device 10 may be reduced.

In the card mode, a mutual induction may occur between the resonance unit 100 and the NFC reader due to the electromagnetic wave EMW emitted from the NFC reader. As a result, the antenna voltage VAN may be generated at the resonance circuit of the resonance unit 100 through the mutual induction with the NFC reader. To perform a receive operation in the card mode, the resonance unit 100 may provide the antenna voltage VAN to the NFC chip 200, and the NFC chip 200 may demodulate the antenna voltage VAN to generate input data. To perform a transmit operation in the card mode, the NFC chip 200 may provide the resonance unit 100 with an impedance corresponding to a modulated signal, which is generated by modulating output data, and the resonance unit 100 may cause the mutual induction with the NFC reader based on the impedance using the electromagnetic wave EMW emitted from the NFC reader.

Figure 2:
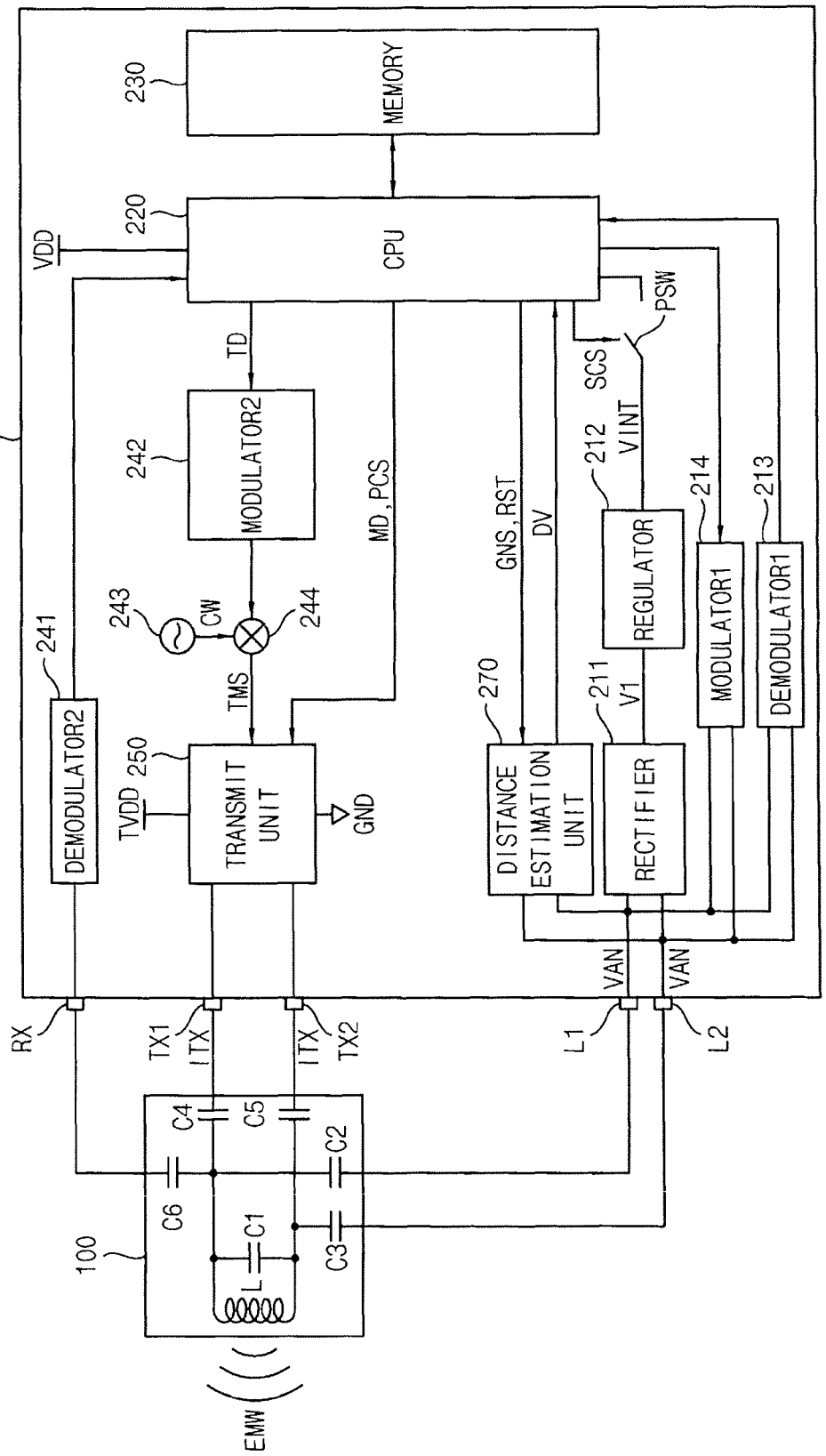
FIG. 2 is a block diagram illustrating an example of an NFC device of FIG. 1 according to an exemplary embodiment of the present invention.

FIG. 2 is a block diagram illustrating an example of an NFC device of FIG. 1 according to an exemplary embodiment of the present invention.

Referring to FIG. 2, the NFC device 10a may include a resonance unit 100 and an NFC chip 200.

The NFC chip 200 may be connected to the resonance unit 100 through a first power electrode L1, a second power electrode L2, a first transmission electrode TX1, a second transmission electrode TX2, and a reception electrode RX.

The resonance unit 100 may include a resonance circuit, which has an antenna L and a first capacitor C1, a first filter, which has a second capacitor C2 and a third capacitor C3 connecting the resonance circuit to the first power electrode L1 and the second power electrode L2, respectively, a matching unit, which has a fourth capacitor C4 and a fifth capacitor C5 connecting the resonance circuit to the first transmission electrode TX1 and the second transmission electrode TX2, respectively, and performs an impedance matching, and a second filter, which has a sixth capacitor C6 connecting the resonance circuit to the reception electrode RX.

The structure of the resonance unit 100 illustrated in FIG. 2 is exemplary, and the structure of the resonance unit 100 according to exemplary embodiments is not limited thereto.

The NFC chip 200 may perform a transmit operation and a receive operation through the first power electrode L1 and the second power electrode L2 in the card mode, perform a transmit operation through the first transmission electrode TX1 and the second transmission electrode TX2 in the reader mode, and perform a receive operation through the reception electrode RX in the reader mode.

The NFC chip 200 may provide the output current ITX to the resonance unit 100 through the first transmission electrode TX1 and the second transmission electrode TX2, and receive the antenna voltage VAN from the resonance unit 100 through the first power electrode L1 and the second power electrode L2.

The NFC chip 200 may include a rectifier 211, a regulator 212, a first demodulator 213, a first modulator 214, a central processing unit (CPU) 220, a power switch PSW, a memory 230, a second demodulator 241, a second modulator 242, an oscillator 243, a mixer 244, a transmit unit 250, and a distance estimation unit 270.

The rectifier 211 may generate a first voltage V1, which is a direct voltage, by rectifying the antenna voltage VAN provided by the resonance unit 100 through the first power electrode L1 and the second power electrode L2.

The regulator 212 may generate an internal voltage VINT, which has a voltage level of a predetermined magnitude usable in the NFC chip 200, using the first voltage V1.

The CPU 220 may control the overall operation of the NFC chip 200. The CPU 220 may operate using a supply voltage VDD provided by a power source, such as, for example, a battery. In addition, the CPU 220 may receive the internal voltage VINT from the regulator 212 through the power switch PSW. When the supply voltage VDD is equal to or higher than a predetermined voltage level, the CPU 220 may operate using the supply voltage VDD and disable a switch control signal SCS to turn off the power switch PSW. When the supply voltage VDD is lower than the predetermined voltage level, the CPU 220 may enable the switch control signal SCS to turn on the power switch PSW such that the CPU 220 may operate using the internal voltage VINT provided by the regulator 212.

When the NFC chip 200 performs the receive operation in the card mode, the first demodulator 213 may generate input data by demodulating a signal provided by the resonance unit 100 through the first power electrode L1 and the second power electrode L2 to provide the input data to the CPU 220. The CPU 220 may store the input data in the memory 230.

When the NFC chip 200 performs the transmit operation in the card mode, the CPU 220 may read out output data from the memory 230 to provide the output data to the first modulator 214, and the first modulator 214 may modulate the output data to provide a modulation signal to the first power electrode L1 and the second power electrode L2. For example, the first modulator 214 may generate the modulation signal by performing a load modulation on the output data.

When the NFC chip 200 performs the receive operation in the reader mode, the second demodulator 241 may generate input data by demodulating a signal provided by the resonance unit 100 through the reception electrode RX to provide the input data to the CPU 220. The CPU 220 may store the input data in the memory 230.

When the NFC chip 200 performs the transmit operation in the reader mode, the CPU 220 may read out output data TD from the memory 230 to provide the output data TD to the second modulator 242, the second modulator 242 may modulate the output data TD to generate a modulation signal, the oscillator 243 may generate a carrier signal CW having a carrier frequency (e.g., about 13.56 MHz), and the mixer 244 may generate a transmission modulation signal TMS by synthesizing the carrier signal CW with the modulation signal.

The transmit unit 250 may be coupled between a transmission supply voltage TVDD and a ground voltage GND.

The CPU 220 may provide a mode signal MD, which represents one of the card mode and the reader mode, to the transmit unit 250, and the transmit unit 250 may operate in the card mode or in the reader mode based on the mode signal MD.

In the reader mode, the transmit unit 250 may provide the output current ITX, which corresponds to the transmission modulation signal TMS received from the mixer 244, to the resonance unit 100 through the first transmission electrode TX1 and the second transmission electrode TX2, and the resonance unit 100 may emit the electromagnetic wave EMW having a magnitude corresponding to the output current ITX.

In exemplary embodiments, in the reader mode, the transmit unit 250 may provide the output current ITX corresponding to the transmission modulation signal TMS to the resonance unit 100 through the first transmission electrode TX1 and the second transmission electrode TX2 by connecting the first transmission electrode TX1 and the second transmission electrode TX2 to the transmission supply voltage TVDD through a pull-up load, or to the ground voltage GND through a pull-down load based on the transmission modulation signal TMS.

For example, in the reader mode, the transmit unit 250 may connect the first transmission electrode TX1 to the transmission supply voltage TVDD through the pull-up load and connect the second transmission electrode TX2 to the ground voltage GND through the pull-down load, or connect the first transmission electrode TX1 to the ground voltage GND through the pull-down load and connect the second transmission electrode TX2 to the transmission supply voltage TVDD through the pull-up load based on the transmission modulation signal TMS to provide the output current ITX corresponding to the transmission modulation signal TMS to the resonance unit 100 through the first transmission electrode TX1 and the second transmission electrode TX2. When the transmit unit 250 connects the first transmission electrode TX1 to the transmission supply voltage TVDD through the pull-up load and connects the second transmission electrode TX2 to the ground voltage GND through the pull-down load, the output current ITX may be generated from the transmission supply voltage TVDD, be provided to the resonance unit 100 through the first transmission electrode TX1, and be sunk to the ground voltage GND through the second transmission electrode TX2. When the transmit unit 250 connects the first transmission electrode TX1 to the ground voltage GND through the pull-down load and connects the second transmission electrode TX2 to the transmission supply voltage TVDD through the pull-up load, the output current ITX may be generated from the transmission supply voltage TVDD, be provided to the resonance unit 100 through the second transmission electrode TX2, and be sunk to the ground voltage GND through the first transmission electrode TX1.

During a period of detecting whether an NFC card is near the NFC device 10 and a period of not performing the transmit operation in the reader mode, the CPU 220 may not provide the output data TD to the second modulator 242. As a result, the output current ITX provided by the transmit unit 250 to the resonance unit 100 through the first transmission electrode TX1 and the second transmission electrode TX2 may substantially correspond to the carrier signal CW.

In the card mode, the first transmission electrode TX1 and the second transmission electrode TX2 may be disconnected from the transmission supply voltage TVDD and the ground voltage GND. As a result, the transmit unit 250 may not provide the output current ITX to the resonance unit 100.

The distance estimation unit 270 may be coupled to the first power electrode L1 and the second power electrode L2, and receive the antenna voltage VAN from the resonance unit 100 through the first power electrode L1 and the second power electrode L2. The distance estimation unit 270 may convert the antenna voltage VAN into a digital value DV based on control signals GNS and RST provided by the CPU 220. The distance estimation unit 270 may provide the digital value DV to the CPU 220.

Figure 3:
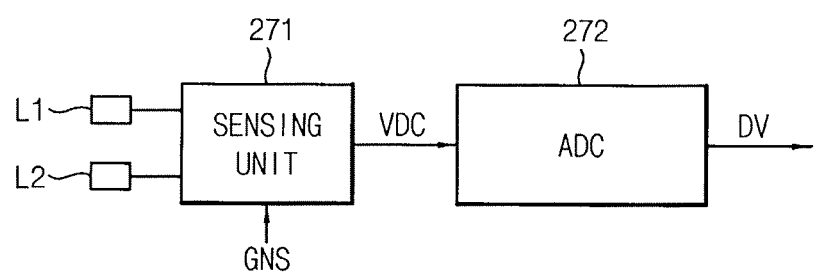
FIG. 3 is a block diagram illustrating an example of a distance estimation unit included in the NFC device of FIG. 2 according to an exemplary embodiment of the present invention.

FIG. 3 is a block diagram illustrating an example of a distance estimation unit included in the NFC device of FIG. 2 according to an exemplary embodiment of the present invention.

Referring to FIG. 3, the distance estimation unit 270 may include a sensing unit 271 and an analog-to-digital conversion unit ADC 272.

The sensing unit 271 may generate a direct voltage VDC based on the antenna voltage VAN received from the resonance unit 100 through the first power electrode L1 and the second power electrode L2. For example, the sensing unit 271 may generate the direct voltage VDC proportional to the magnitude of the antenna voltage VAN and a gain signal GNS provided by the CPU 220.

During a period of detecting whether an NFC card is near the NFC device 10 and a period of operating in the reader mode, the transmit unit 250 may provide the output current ITX to the resonance unit 100 through the first transmission electrode TX1 and the second transmission electrode TX2, and the resonance unit 100 may emit the electromagnetic wave EMW having a magnitude corresponding to the output current ITX. Alternatively, during a period of detecting whether an NFC reader is near the NFC device 10 and a period of operating in the card mode, the transmit unit 250 may not provide the output current ITX to the resonance unit 100, and as a result, the resonance unit 100 may not emit the electromagnetic wave EMW. Therefore, the magnitude of the antenna voltage VAN generated by the resonance unit 100 during the period of detecting whether an NFC card is near the NFC device 10 and the period of operating in the reader mode may be greater than the magnitude of the antenna voltage VAN generated by the resonance unit 100 during the period of detecting whether an NFC reader is near the NFC device 10 and the period of operating in the card mode. Therefore, the CPU 220 may provide the gain signal GNS having a first value to the sensing unit 271 during the period of detecting whether an NFC card is near the NFC device 10 and the period of operating in the reader mode, and may provide the gain signal GNS having a second value greater than the first value to the sensing unit 271 during the period of detecting whether an NFC reader is near the NFC device 10 and the period of operating in the card mode. Thus, the sensing unit 271 may generate the direct voltage VDC having a magnitude in a predetermined voltage range regardless of the operation mode.

Figure 4:
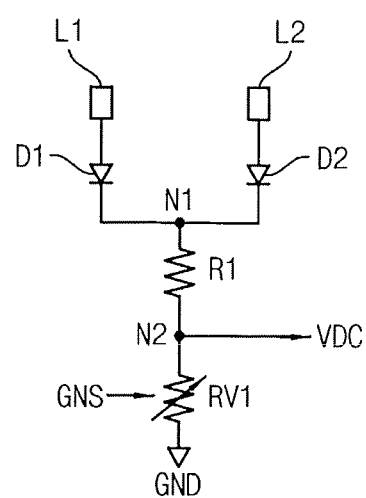
FIG. 4 is a block diagram illustrating an example of a sensing unit included in the distance estimation unit of FIG. 3 according to an exemplary embodiment of the present invention.

FIG. 4 is a block diagram illustrating an example of a sensing unit included in the distance estimation unit of FIG. 3 according to an exemplary embodiment of the present invention.

Referring to FIG. 4, a sensing unit 271a may include a rectification circuit having a first diode D1 and a second diode D2, and a first resistor R1 and a first variable resistor RV1.

The first diode D1 may be coupled between the first power electrode L1 and a first node N1, and the second diode D2 may be coupled between the second power electrode L2 and the first node N1. As a result, the rectification circuit may rectify the antenna voltage VAN received through the first power electrode L1 and the second power electrode L2 to generate a rectified voltage.

The first resistor R1 may be coupled between the first node N1 and a second node N2, and the first variable resistor RV1 may be coupled between the second node N2 and the ground voltage GND. The first variable resistor RV1 may have a resistance corresponding to the gain signal GNS.

Since the first resistor R1 and the first variable resistor RV1 operate as a voltage divider that divides the rectified voltage, the sensing unit 271a may convert the antenna voltage VAN to the direct voltage VDC based on the gain signal GNS, and output the direct voltage VDC through the second node N2.

Figure 5:
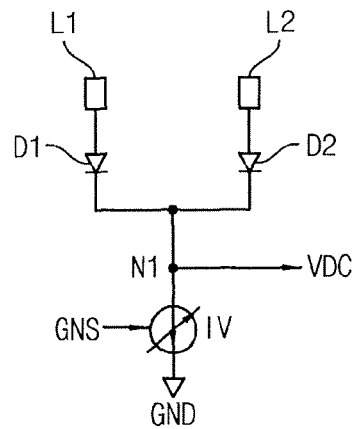
FIG. 5 is a block diagram illustrating an example of a sensing unit included in the distance estimation unit of FIG. 3 according to an exemplary embodiment of the present invention.

FIG. 5 is a block diagram illustrating an example of a sensing unit included in the distance estimation unit of FIG. 3 according to an exemplary embodiment of the present invention.

Referring to FIG. 5, a sensing unit 271b may include a rectification circuit having a first diode D1 and a second diode D2, and a variable current source IV.

The first diode D1 may be coupled between the first power electrode L1 and a first node N1, and the second diode D2 may be coupled between the second power electrode L2 and the first node N1. As a result, the rectification circuit may rectify the antenna voltage VAN received through the first power electrode L1 and the second power electrode L2 to generate a rectified voltage.

The variable current source IV may be coupled between the first node N1 and the ground voltage GND. The variable current source IV may generate a current having a magnitude corresponding to the gain signal GNS.

Since a magnitude of the rectified voltage is varied according to a magnitude of the current generated from the variable current source IV, the sensing unit 271b may convert the antenna voltage VAN to the direct voltage VDC based on the gain signal GNS, and output the direct voltage VDC through the first node N1.

Referring again to FIG. 3, the analog-to-digital conversion unit 272 may generate the digital value DV by performing an analog-to-digital conversion on the direct voltage VDC provided by the sensing unit 271.

Figure 6:
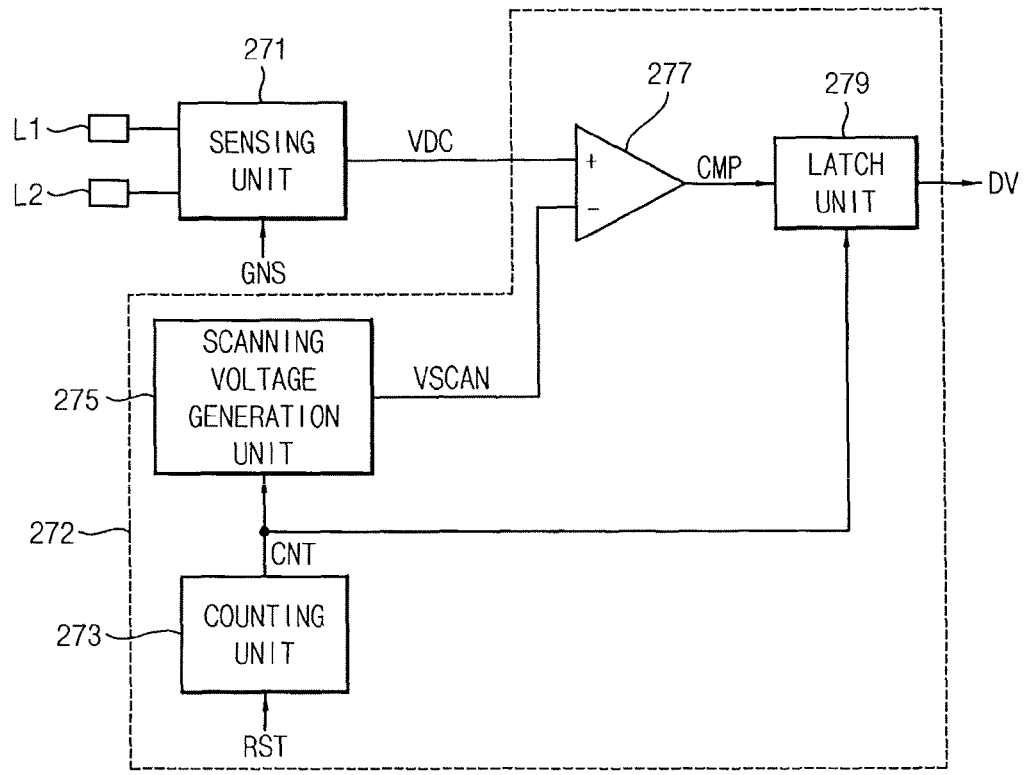
FIG. 6 is a block diagram illustrating an example of an analog-to-digital conversion unit included in the distance estimation unit of FIG. 3 according to an exemplary embodiment of the present invention.

FIG. 6 is a block diagram illustrating an example of an analog-to-digital conversion unit included in the distance estimation unit of FIG. 3 according to an exemplary embodiment of the present invention.

Referring to FIG. 6, the analog-to-digital conversion unit 272 may include a counting unit 273, a scanning voltage generation unit 275, a comparator 277, and a latch unit 279.

The counting unit 273 may generate a counting value CNT by performing, for example, an up-counting operation, and may reset the counting value CNT in response to a reset signal RST provided by the CPU 220.

The scanning voltage generation unit 275 may generate a scanning voltage VSCAN sequentially increasing based on the counting value CNT.

Figure 7:
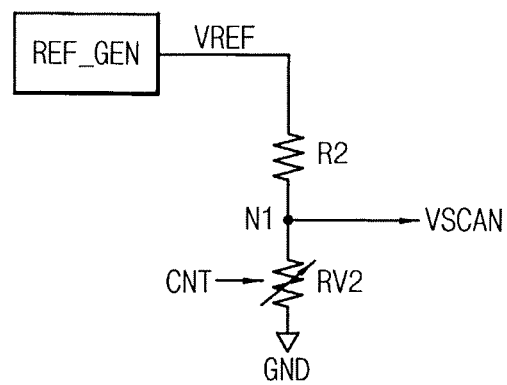
FIG. 7 is a block diagram illustrating an example of a scanning voltage generation unit included in the analog-to-digital conversion unit of FIG. 6 according to an exemplary embodiment of the present invention.

FIG. 7 is a block diagram illustrating an example of a scanning voltage generation unit included in the analog-to-digital conversion unit of FIG. 6 according to an exemplary embodiment of the present invention.

Referring to FIG. 7, the scanning voltage generation unit 275 may include a reference voltage generator REF_GEN, a second resistor R2, and a second variable resistor RV2.

The reference voltage generator REF_GEN may generate a reference voltage VREF having a predetermined voltage level.

The second resistor R2 may be coupled between the reference voltage generator REF_GEN and a first node N1, and the second variable resistor RV2 may be coupled between the first node N1 and the ground voltage GND. The second variable resistor RV2 may have a resistance corresponding to the counting value CNT.

Since the second resistor R2 and the second variable resistor RV2 operate as a voltage divider, the scanning voltage generation unit 275 may generate the scanning voltage VSCAN proportional to the counting value CNT, and may output the scanning voltage VSCAN through the first node N1.

In addition, the scanning voltage generation unit 275 may control the precision of the distance estimation unit 270 for converting the antenna voltage VAN to the digital value DV by adjusting an increase rate of a resistance of the second variable resistor RV2 with reference to the counting value CNT.

Referring again to FIG. 6, the comparator 277 may output a comparison signal CMP having a first logic level when the direct voltage VDC is greater than the scanning voltage VSCAN, and having a second logic level when the direct voltage VDC is equal to or smaller than the scanning voltage VSCAN. That is, the comparator 277 may output a comparison signal CMP having a first logic level in response to the direct voltage VDC being greater than the scanning voltage VSCAN, and may output a comparison signal CMP having a second logic level in response to the direct voltage VDC being equal to or smaller than the scanning voltage VSCAN.

Since the scanning voltage VSCAN increases sequentially based on the counting value CNT, the comparator 277 may initially output the comparison signal CMP having the first logic level, and transition the comparison signal CMP to the second logic level when the scanning voltage VSCAN becomes greater than the direct voltage VDC. That is, the comparator 277 may transition the comparison signal CMP to the second logic level in response to the scanning voltage VSCAN becoming greater than the direct voltage VDC.

The latch unit 279 may latch the counting value CNT in response to a transition of the comparison signal CMP, and may output the latched value as the digital value DV.

The structure of the analog-to-digital conversion unit 272 described above with reference to FIGS. 6 and 7 is exemplary, and the structure of the analog-to-digital conversion unit 272 is not limited thereto. For example, the analog-to-digital conversion unit 272 may be implemented in various structures capable of performing analog-to-digital conversion.

Referring again to FIG. 2, the CPU 220 may detect whether an NFC card or an NFC reader is near the NFC device 10 based on the digital value DV. In exemplary embodiments, the CPU 220 may detect the NFC reader based on the digital value DV and a first threshold voltage, and detect the NFC card based on the digital value DV and a second threshold voltage. A method of detecting the NFC card or the NFC reader is described below.

The CPU 220 may generate the mode signal MD having a first value and operate in the reader mode when the CPU 220 detects the NFC card near the NFC device 10. The CPU 220 may generate the mode signal MD having a second value and operate in the card mode when the CPU 220 detects the NFC reader near the NFC device 10. That is, the CPU 220 may generate the mode signal MD having a first value and operate in the reader mode in response to the CPU 220 detecting the NFC card near the NFC device 10, and may generate the mode signal MD having a second value and operate in the card mode in response to the CPU 220 detecting the NFC reader near the NFC device 10.

In the reader mode, the CPU 220 may generate a power control signal PCS based on the digital value DV and may provide the power control signal PCS to the transmit unit 250, and the transmit unit 250 may adjust the magnitude of the output current ITX, which is provided to the resonance unit 100, based on the power control signal PCS. That is, the transmit unit 250 may determine the magnitude of the output current ITX based on the power control signal PCS provided by the CPU 220 when the transmit unit 250 generates the output current ITX corresponding to the transmission modulation signal TMS.

When the distance between the NFC device 10a and the NFC card is relatively small, a relatively strong mutual induction may occur between the resonance unit 100 and the NFC card such that the antenna voltage VAN decreases, and as a result, the digital value DV decreases. When the distance between the NFC device 10a and the NFC card is relatively large, a relatively weak mutual induction may occur between the resonance unit 100 and the NFC card such that the antenna voltage VAN increases, and as a result, the digital value DV increases. Therefore, the CPU 220 may estimate the distance between the NFC device 10a and the NFC card based on the digital value DV.

When the digital value DV decreases, the CPU 220 may determine that the distance between the NFC device 10a and the NFC card decreases, and may decrease a magnitude of the power control signal PCS. Alternatively, when the digital value DV increases, the CPU 220 may determine that the distance between the NFC device 10a and the NFC card increases, and may increase the magnitude of the power control signal PCS. The transmit unit 250 may decrease the magnitude of the output current ITX when the magnitude of the power control signal PCS decreases, and may increase the magnitude of the output current ITX when the magnitude of the power control signal PCS increases.

Figure 8:
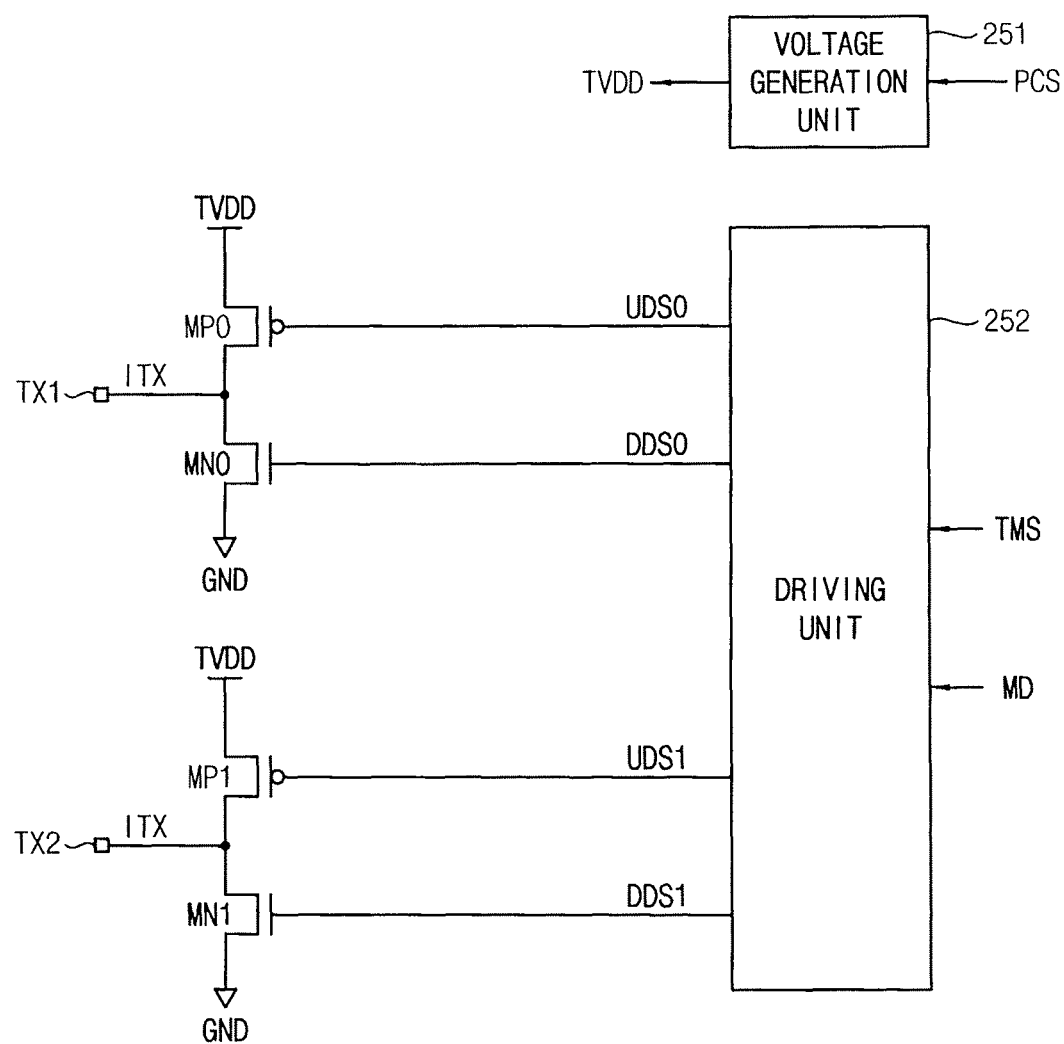
FIG. 8 is a block diagram illustrating an example of a transmit unit included in the NFC device of FIG. 2 according to an exemplary embodiment of the present invention.

FIG. 8 is a block diagram illustrating an example of a transmit unit included in the NFC device of FIG. 2 according to an exemplary embodiment of the present invention.

Referring to FIG. 8, a transmit unit 250a may include a first pull-up transistor MP0, a second pull-up transistor MP1, a first pull-down transistor MN0, a second pull-down transistor MN1, a voltage generation unit 251, and a driving unit 252.

The voltage generation unit 251 may generate the transmission supply voltage TVDD based on the power control signal PCS provided by the CPU 220. For example, the voltage generation unit 251 may generate the transmission supply voltage TVDD having a magnitude corresponding to the magnitude of the power control signal PCS.

The first pull-up transistor MP0 and the second pull-up transistor MP1 may be, for example, p-type metal oxide semiconductor (PMOS) transistors. The first pull-down transistor MN0 and the second pull-down transistor MN1 may be, for example, n-type metal oxide semiconductor (NMOS) transistors.

The first pull-up transistor MP0 may be coupled between the transmission supply voltage TVDD and the first transmission electrode TX1, and the first pull-down transistor MN0 may be coupled between the first transmission electrode TX1 and the ground voltage GND.

The second pull-up transistor MP1 may be coupled between the transmission supply voltage TVDD and the second transmission electrode TX2, and the second pull-down transistor MN1 may be coupled between the second transmission electrode TX2 and the ground voltage GND.

The driving unit 252 may drive the first pull-up transistor MP0 using a first pull-up driving signal UDS0, drive the first pull-down transistor MN0 using a first pull-down driving signal DDS0, drive the second pull-up transistor MP1 using a second pull-up driving signal UDS1, and drive the second pull-down transistor MN1 using a second pull-down driving signal DDS1.

The driving unit 252 may operate in the card mode or in the reader mode based on the mode signal MD provided by the CPU 220.

In the card mode, the driving unit 252 may turn off the first pull-up transistor MP0, the first pull-down transistor MN0, the second pull-up transistor MP1, and the second pull-down transistor MN1. As a result, the transmit unit 250a may not provide the output current ITX to the resonance unit 100 in the card mode.

In the reader mode, the driving unit 252 may turn on one of the first pull-up transistor MP0 and the first pull-down transistor MN0, and turn on one of the second pull-up transistor MP1 and the second pull-down transistor MN1 based on the transmission modulation signal TMS.

For example, in the reader mode, the driving unit 252 may turn on the first pull-up transistor MP0 and the second pull-down transistor MN1 and turn off the second pull-up transistor MP1 and the first pull-down transistor MN0, or turn on the second pull-up transistor MP1 and the first pull-down transistor MN0 and turn off the first pull-up transistor MP0 and the second pull-down transistor MN1 based on the transmission modulation signal TMS.

When the driving unit 252 turns on the first pull-up transistor MP0 and the second pull-down transistor MN1 and turns off the second pull-up transistor MP1 and the first pull-down transistor MN0, the output current ITX may be generated by the transmission supply voltage TVDD, may be provided to the resonance unit 100 through the first pull-up transistor MP0 and the first transmission electrode TX1, and may be sunk to the ground voltage GND through the second transmission electrode TX2 and the second pull-down transistor MN1. Alternatively, when the driving unit 252 turns on the second pull-up transistor MP1 and the first pull-down transistor MN0 and turns off the first pull-up transistor MP0 and the second pull-down transistor MN1, the output current ITX may be generated by the transmission supply voltage TVDD, may be provided to the resonance unit 100 through the second pull-up transistor MP1 and the second transmission electrode TX2, and may be sunk to the ground voltage GND through the first transmission electrode TX1 and the first pull-down transistor MN0.

Therefore, the magnitude of the output current ITX, which is provided by the transmit unit 250a to the resonance unit 100 through the first transmission electrode TX1 and the second transmission electrode TX2 in the reader mode, may be proportional to a magnitude of the transmission supply voltage TVDD.

The voltage generation unit 251 may decrease the transmission supply voltage TVDD when the power control signal PCS decreases, and may increase the transmission supply voltage TVDD when the power control signal PCS increases. That is, the voltage generation unit 251 may decrease the transmission supply voltage TVDD in response to the power control signal PCS decreasing, and may increase the transmission supply voltage TVDD in response to the power control signal PCS increasing.

As described above, the CPU 220 may estimate the distance between the NFC device 10a and the NFC card and generate the power control signal PCS based on the estimated distance, and the transmit unit 250a may optimize the magnitude of the electromagnetic wave EMW, which is emitted from the resonance unit 100, by adjusting the magnitude of the output current ITX, which is provided to the resonance unit 100, based on the power control signal PCS. As a result, power consumption of the NFC device 10a may be reduced.

Figure 9:
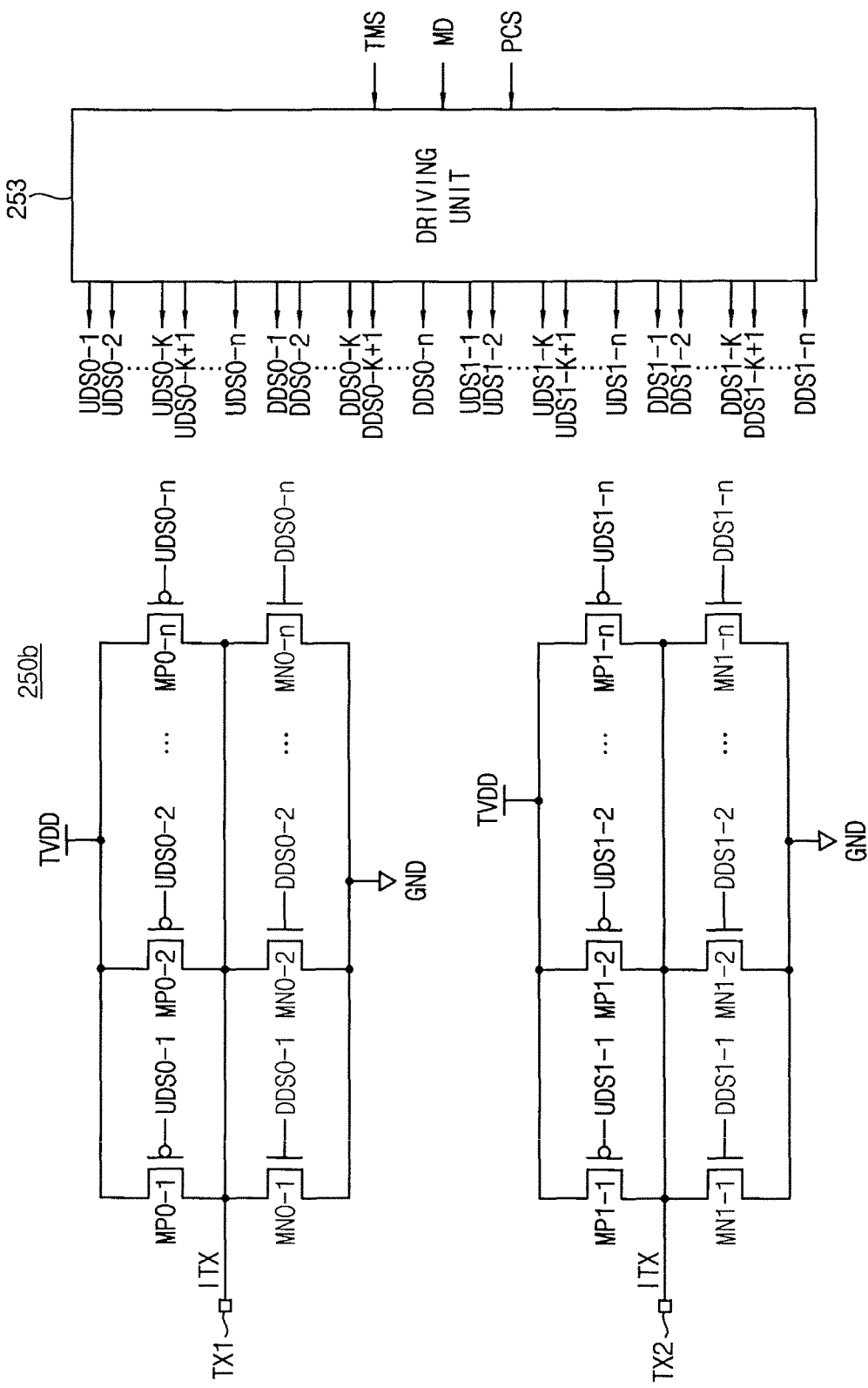
FIG. 9 is a block diagram illustrating an example of a transmit unit included in the NFC device of FIG. 2 according to an exemplary embodiment of the present invention.

FIG. 9 is a block diagram illustrating an example of a transmit unit included in the NFC device of FIG. 2 according to an exemplary embodiment of the present invention.

Referring to FIG. 9, a transmit unit 250b may include a plurality of first pull-up transistors MP0-1, MP0-2, ..., MP0-n, a plurality of second pull-up transistors MP1-1, MP1-2, ..., MP1-n, a plurality of first pull-down transistors MN0-1, MN0-2, ..., MN0-n, a plurality of second pull-down transistors MN1-1, MN1-2, ..., MN1-n, and a driving unit 253. Here, n represents an integer equal to or greater than two.

The plurality of first pull-up transistors MP0-1, MP0-2, ..., MP0-n and the plurality of second pull-up transistors MP1-1, MP1-2, ..., MP1-n may be, for example, PMOS transistors, and the plurality of first pull-down transistors MN0-1, MN0-2, ..., MN0-n and the plurality of second pull-down transistors MN1-1, MN1-2, ..., MN1-n may be, for example, NMOS transistors.

The plurality of first pull-up transistors MP0-1, MP0-2, ..., MP0-n may be coupled in parallel between the transmission supply voltage TVDD and the first transmission electrode TX1, and the plurality of first pull-down transistors MN0-1, MN0-2, ..., MN0-n may be coupled in parallel between the first transmission electrode TX1 and the ground voltage GND.

The plurality of second pull-up transistors MP1-1, MP1-2, ..., MP1-n may be coupled in parallel between the transmission supply voltage TVDD and the second transmission electrode TX2, and the plurality of second pull-down transistors MN1-1, MN1-2, ..., MN 1-n may be coupled in parallel between the second transmission electrode TX2 and the ground voltage GND.

The driving unit 253 may drive the plurality of first pull-up transistors MP0-1, MP0-2, ..., MP0-n using a plurality of first pull-up driving signals UDS0-1, UDS0-2, ..., UDS0-n, respectively, drive the plurality of first pull-down transistors MN0-1, MN0-2, ..., MN0-n using a plurality of first pull-down driving signals DDS0-1, DDS0-2, ..., DDS0-n, respectively, drive the plurality of second pull-up transistors MP1-1, MP1-2, ..., MP1-n using a plurality of second pull-up driving signals UDS1-1, UDS1-2, ..., UDS1-n, respectively, and drive the plurality of second pull-down transistors MN 1-1, MN 1-2, ..., MN1-n using a plurality of second pull-down driving signals DDS1-1, DDS1-2, ..., DDS 1-n.

The driving unit 253 may operate in the card mode or in the reader mode based on the mode signal MD provided by the CPU 220.

In the card mode, the driving unit 253 may turn off the plurality of first pull-up transistors MP0-1, MP0-2, ..., MP0-n, the plurality of first pull-down transistors MN0-1, MN0-2, ..., MN0-n, the plurality of second pull-up transistors MP1-1, MP1-2, ..., MP1-n, and the plurality of second pull-down transistors MN1-1, MN1-2, ..., MN1-n. As a result, the transmit unit 250b may not provide the output current ITX to the resonance unit 100 in the card mode.

In the reader mode, the driving unit 253 may select k first pull-up transistors MP0-1, MP0-2, ..., MP0-k from among the plurality of first pull-up transistors MP0-1, MP0-2, ..., MP0-n, select k second pull-up transistors MP1-1, MP1-2, ..., MP1-k from among the plurality of second pull-up transistors MP1-1, MP1-2, ..., MP1-n, select k first pull-down transistors MN0-1, MN0-2, ..., MN0-k from among the plurality of first pull-down transistors MN0-1, MN0-2, . . . , MN0-n, and select k second pull-down transistors MN1-1, MN1-2, . . . , MN1-k from among the plurality of second pull-down transistors MN1-1, MN1-2, . . . , MN1-n based on the power control signal PCS provided by the CPU 220. Here, k represents a positive integer equal to or less than n.

The driving unit 253 may decrease a number of the selected first pull-up transistors, a number of the selected second pull-up transistors, a number of the selected first pull-down transistors, and a number of the selected second pull-down transistors when the power control signal PCS decreases, and may increase the number of the selected first pull-up transistors, the number of the selected second pull-up transistors, the number of the selected first pull-down transistors, and the number of the selected second pull-down transistors when the power control signal PCS increases. That is, the driving unit 253 may decrease a number of the selected first pull-up transistors, a number of the selected second pull-up transistors, a number of the selected first pull-down transistors, and a number of the selected second pull-down transistors in response to the power control signal PCS decreasing, and may increase the number of the selected first pull-up transistors, the number of the selected second pull-up transistors, the number of the selected first pull-down transistors, and the number of the selected second pull-down transistors in response to the power control signal PCS increasing.

The driving unit 253 may maintain unselected transistors from among the plurality of first pull-up transistors MP0-1, MP0-2, . . . , MP0-n, the plurality of second pull-up transistors MP1-1, MP1-2, . . . , MP1-n, the plurality of first pull-down transistors MN0-1, MN0-2, . . . , MN0-n, and the plurality of second pull-down transistors MN1-1, MN 1-2, . . . , MN1-n to be turned off.

The driving unit 253 may turn on one of the selected k first pull-up transistors MP0-1, MP0-2, . . . , MP0-k and the selected k first pull-down transistors MN0-1, MN0-2, . . . , MN0-k, and turn on one of the selected k second pull-up transistors MP1-1, MP1-2, . . . , MP1-k and the selected k second pull-down transistors MN 1-1, MN1-2, . . . , MN1-k based on the transmission modulation signal TMS.

For example, in the reader mode, the driving unit 253 may turn on the selected k first pull-up transistors MP0-1, MP0-2, . . . , MP0-k and the selected k second pull-down transistors MN1-1, MN1-2, . . . , MN1-k and turn off the selected k second pull-up transistors MP1-1, MP1-2, . . . , MP1-k and the selected k first pull-down transistors MN0-1, MN0-2, . . . , MN0-k, or turn on the selected k second pull-up transistors MP1-1, MP1-2, . . . , MP1-k and the selected k first pull-down transistors MN0-1, MN0-2, . . . , MN0-k and turn off the selected k first pull-up transistors MP0-1, MP0-2, . . . , MP0-k and the selected k second pull-down transistors MN1-1, MN1-2, . . . , MN1-k based on the transmission modulation signal TMS.

When the driving unit 253 turns on the selected k first pull-up transistors MP0-1, MP0-2, . . . , MP0-k and the selected k second pull-down transistors MN1-1, MN1-2, . . . , MN1-k and turns off the selected k second pull-up transistors MP1-1, MP1-2, . . . , MP1-k and the selected k first pull-down transistors MN0-1, MN0-2, . . . , MN0-k, the output current ITX may be generated by the transmission supply voltage TVDD, be provided to the resonance unit 100 through the selected k first pull-up transistors MP0-1, MP0-2, . . . , MP0-k and the first transmission electrode TX1, and be sunk to the ground voltage GND through the second transmission electrode TX2 and the selected k second pull-down transistors MN1-1, MN1-2, . . . , MN1-k. Alternatively, when the driving unit 253 turns on the selected k second pull-up transistors MP1-1, MP1-2, . . . , MP1-k and the selected k first pull-down transistors MN0-1, MN0-2, . . . , MN0-k and turns off the selected k first pull-up transistors MP0-1, MP0-2, . . . , MP0-k and the selected k second pull-down transistors MN1-1, MN1-2, . . . , MN1-k, the output current ITX may be generated by the transmission supply voltage TVDD, be provided to the resonance unit 100 through the selected k second pull-up transistors MP1-1, MP1-2, . . . , MP1-k and the second transmission electrode TX2, and be sunk to the ground voltage GND through the first transmission electrode TX1 and the selected k first pull-down transistors MN0-1, MN0-2, . . . , MN0-k.

As a result, the magnitude of the output current ITX, which is provided by the transmit unit 250*b* to the resonance unit 100 through the first transmission electrode TX1 and the second transmission electrode TX2 in the reader mode, may be proportional to the number of the selected transistors.

As described above, the CPU 220 may estimate the distance between the NFC device 10*a* and the NFC card and generate the power control signal PCS based on the estimated distance, and the transmit unit 250*b* may optimize the magnitude of the electromagnetic wave EMW, which is emitted from the resonance unit 100, by adjusting the magnitude of the output current ITX, which is provided to the resonance unit 100, based on the power control signal PCS. As a result, power consumption of the NFC device 10*a* may be reduced.

Figure 10:
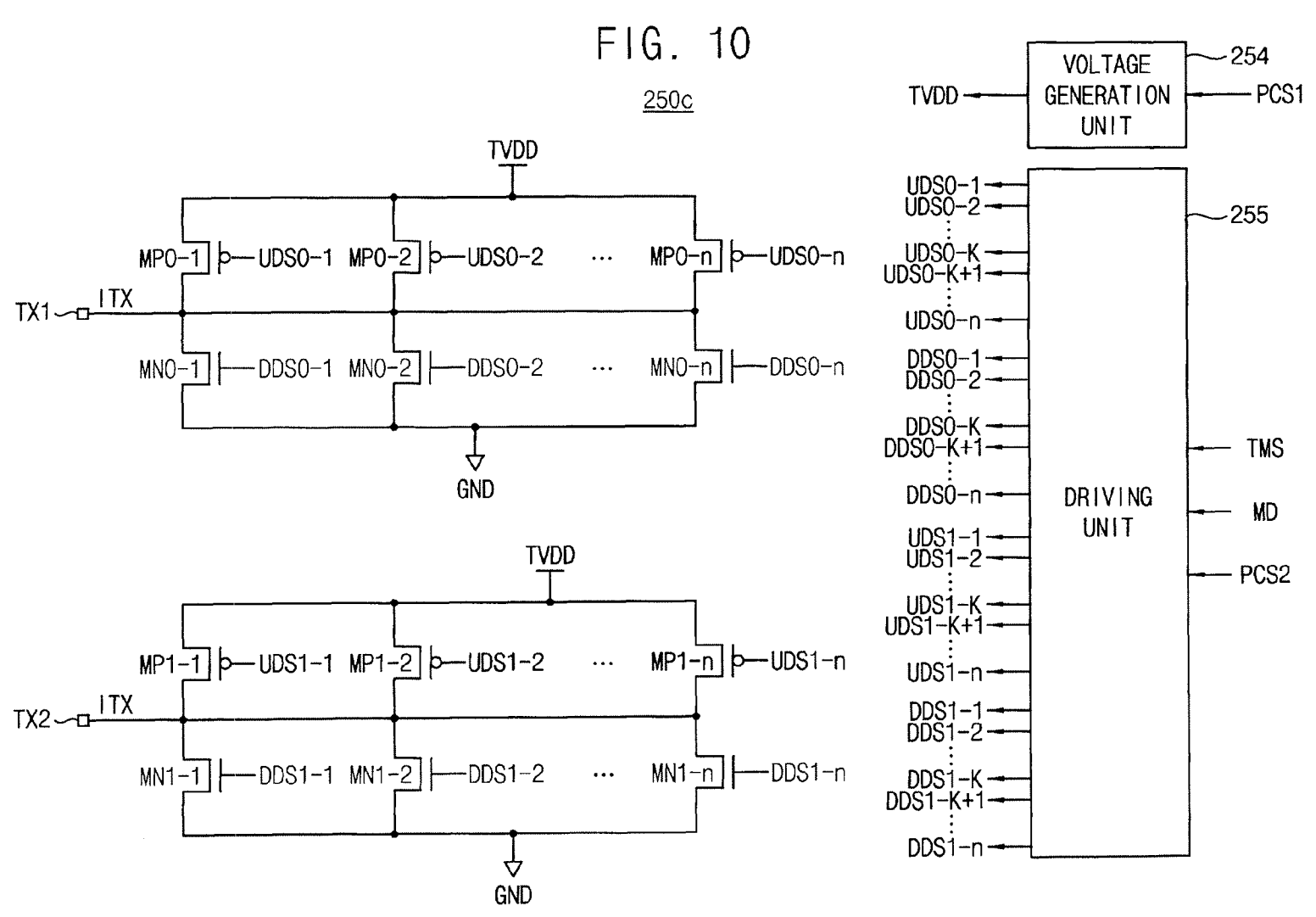

FIG. 10 is a block diagram illustrating an example of a transmit unit included in the NFC device of FIG. 2 according to an exemplary embodiment of the present invention.

Referring to FIG. 10, a transmit unit 250*c* may include a plurality of first pull-up transistors MP0-1, MP0-2, . . . , MP0-n, a plurality of second pull-up transistors MP1-1, MP1-2, . . . , MP1-n, a plurality of first pull-down transistors MN0-1, MN0-2, . . . , MN0-n, a plurality of second pull-down transistors MN1-1, MN1-2, . . . , MN1-n, a voltage generation unit 254, and a driving unit 255.

The power control signal PCS provided by the CPU 220 to the transmit unit 250*c* may include a first power control signal PCS1 and a second power control signal PCS2.

When the digital value DV decreases, the CPU 220 may determine that the distance between the NFC device 10*a* and the NFC card has decreased, and may decrease a magnitude of at least one of the first power control signal PCS 1 and the second power control signal PCS2. Alternatively, when the digital value DV increases, the CPU 220 may determine that the distance between the NFC device 10*a* and the NFC card has increased, and may increase the magnitude of at least one of the first power control signal PCS1 and the second power control signal PCS2. The transmit unit 250 may decrease the magnitude of the output current ITX when the magnitude of the power control signal PCS decreases, and may increase the magnitude of the output current ITX when the magnitude of the power control signal PCS increases.

The voltage generation unit 254 may generate the transmission supply voltage TVDD based on the first power control signal PCS1 provided by the CPU 220. For example, the voltage generation unit 254 may generate the transmission supply voltage TVDD having a magnitude corresponding to the magnitude of the first power control signal PCS1.

The plurality of first pull-up transistors MP0-1, MP0-2, . . . , MP0-n and the plurality of second pull-up transistors MP1-1, MP1-2, . . . , MP1-n may be, for example, PMOS transistors, and the plurality of first pull-down transistors MN0-1, MN0-2, ..., MN0-n and the plurality of second pull-down transistors MN1-1, MN1-2, ..., MN1-n may be, for example, NMOS transistors.

The plurality of first pull-up transistors MP0-1, MP0-2, ..., MP0-n may be coupled in parallel between the transmission supply voltage TVDD and the first transmission electrode TX1, and the plurality of first pull-down transistors MN0-1, MN0-2, ..., MN0-n may be coupled in parallel between the first transmission electrode TX1 and the ground voltage GND.

The plurality of second pull-up transistors MP1-1, MP1-2, ..., MP1-n may be coupled in parallel between the transmission supply voltage TVDD and the second transmission electrode TX2, and the plurality of second pull-down transistors MN1-1, MN1-2, ..., MN 1-n may be coupled in parallel between the second transmission electrode TX2 and the ground voltage GND.

The driving unit 255 included in the transmit unit 250c of FIG. 10 may operate in a similar manner as the driving unit 253 included in the transmit unit 250b of FIG. 9, except that the driving unit 255 receives the second power control signal PCS2 instead of the power control signal PCS. Since the operation of the driving unit 253 included in the transmit unit 250b of FIG. 9 is described above with reference to FIG. 9, a detailed description of the driving unit 255 included in the transmit unit 250c of FIG. 10 will be omitted.

As described above, the magnitude of the output current ITX, which is provided by the transmit unit 250c to the resonance unit 100 through the first transmission electrode TX1 and the second transmission electrode TX2 in the reader mode, may be proportional to the magnitude of the transmission supply voltage TVDD and the number of the selected transistors.

The CPU 220 may estimate the distance between the NFC device 10a and the NFC card and generate the first power control signal PCS1 and the second power control signal PCS2 based on the estimated distance, and the transmit unit 250c may optimize the magnitude of the electromagnetic wave EMW, which is emitted from the resonance unit 100, by adjusting the magnitude of the output current ITX, which is provided to the resonance unit 100, based on the first power control signal PCS 1 and the second power control signal PCS2. As a result, power consumption of the NFC device 10a may be reduced.

Hereinafter, an operation of the NFC device 10a according to an exemplary embodiment of the present invention is described with reference to FIGS. 2 to 10.

When the NFC device 10a turns on, the NFC device 10a may alternately perform an operation detecting whether an NFC card is near the NFC device 10a and an operation detecting whether an NFC reader is near the NFC device 10a.

In exemplary embodiments, to detect whether an NFC reader is present near the NFC device 10a, the transmit unit 250 may be turned off, and when the resonance unit 100 receives the electromagnetic wave EMW, the resonance unit 100 may generate the antenna voltage VAN in response to the electromagnetic wave EMW. The distance estimation unit 270 may periodically receive the antenna voltage VAN from the resonance unit 100 through the first power electrode L1 and the second power electrode L2 and generate the digital value DV based on the antenna voltage VAN. The CPU 220 may determine that an NFC reader is detected near the NFC device 10a when a voltage corresponding to the digital value DV is higher than a first threshold voltage.

Figure 11:
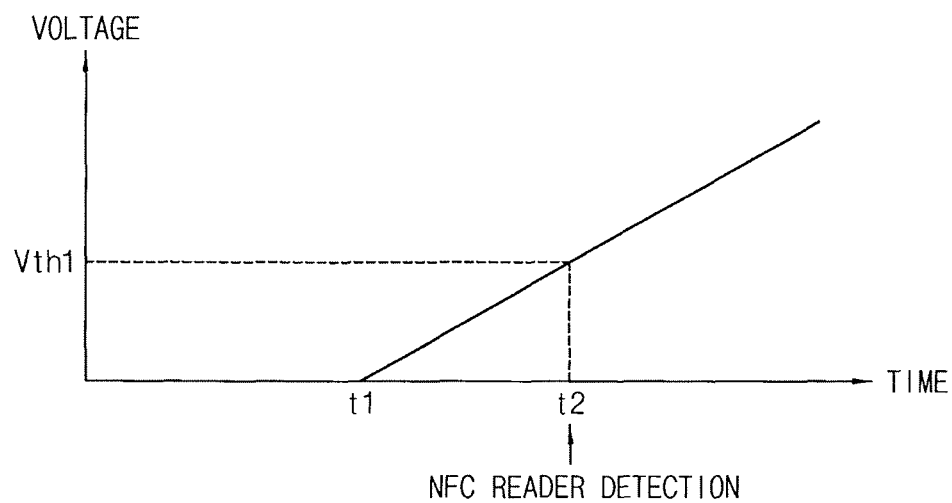
FIG. 11 is a diagram used to describe an operation of the NFC device of FIG. 2 to detect whether an NFC reader is near the NFC device according to an exemplary embodiment of the present invention.

FIG. 11 is a diagram used to describe an operation of the NFC device of FIG. 2 to detect whether an NFC reader is near the NFC device according to an exemplary embodiment of the present invention.

In FIG. 11, the x-axis represents time and the y-axis represents the antenna voltage VAN generated by the resonance unit 100.

As illustrated in FIG. 11, when an NFC reader is not near the NFC device 10a, the resonance unit 100 does not receive the electromagnetic wave EMW, and the antenna voltage VAN generated by the resonance unit 100 is substantially zero.

As the NFC device 10a approaches an NFC reader, the resonance unit 100 may start to receive the electromagnetic wave EMW emitted from the NFC reader at a first time t1. After the first time t1, a mutual induction may occur between the resonance unit 100 and the NFC reader such that the antenna voltage VAN may be generated by the resonance unit 100.

As the distance between the NFC device 10a and the NFC reader decreases, the antenna voltage VAN generated by the resonance unit 100 may increase such that the antenna voltage VAN becomes greater than a first threshold voltage Vth1 at a second time t2.

Therefore, the CPU 220 may determine that the NFC reader is detected near the NFC device 10a when the voltage corresponding to the digital value DV received from the distance estimation unit 270 is higher than the first threshold voltage Vth1.

When the NFC device 10a detects the NFC reader near the NFC device 10a, the NFC device 10a may operate in the card mode.

In exemplary embodiments, to detect whether an NFC card is near the NFC device 10a, the transmit unit 250 may periodically provide the output current ITX corresponding to the carrier signal CW to the resonance unit 100 through the first transmission electrode TX1 and the second transmission electrode TX2, and the resonance unit 100 may periodically emit the electromagnetic wave EMW corresponding to the output current ITX. When an NFC card is not near the NFC device 10a, a standard voltage may be applied to the resonance circuit of the resonance unit 100 while the resonance unit 100 emits the electromagnetic wave EMW. The distance estimation unit 270 may convert the antenna voltage VAN received from the resonance unit 100 through the first power electrode L1 and the second power electrode L2 to the digital value DV while the resonance unit 100 emits the electromagnetic wave EMW. The CPU 200 may determine that the NFC card is detected near the NFC device 10a when a voltage corresponding to the digital value DV is lower than the standard voltage by a second threshold voltage or more (e.g., by at least a second threshold voltage).

Figure 12:
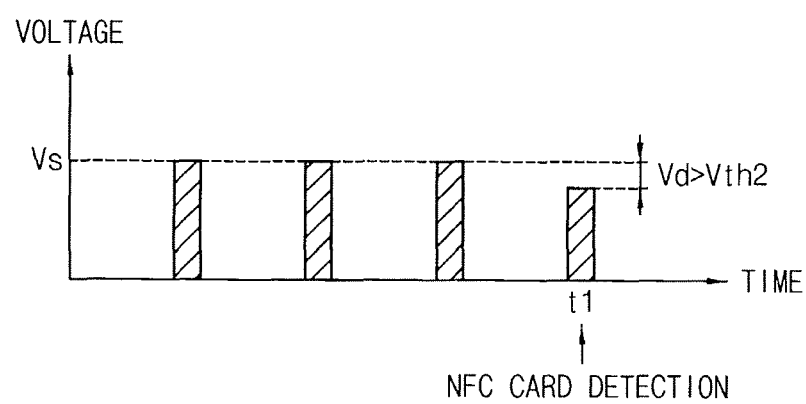
FIGS. 12 and 13 are diagrams used to describe an operation of the NFC device of FIG. 2 to detect whether an NFC card is near the NFC device according to an exemplary embodiment of the present invention.
Figure 13:
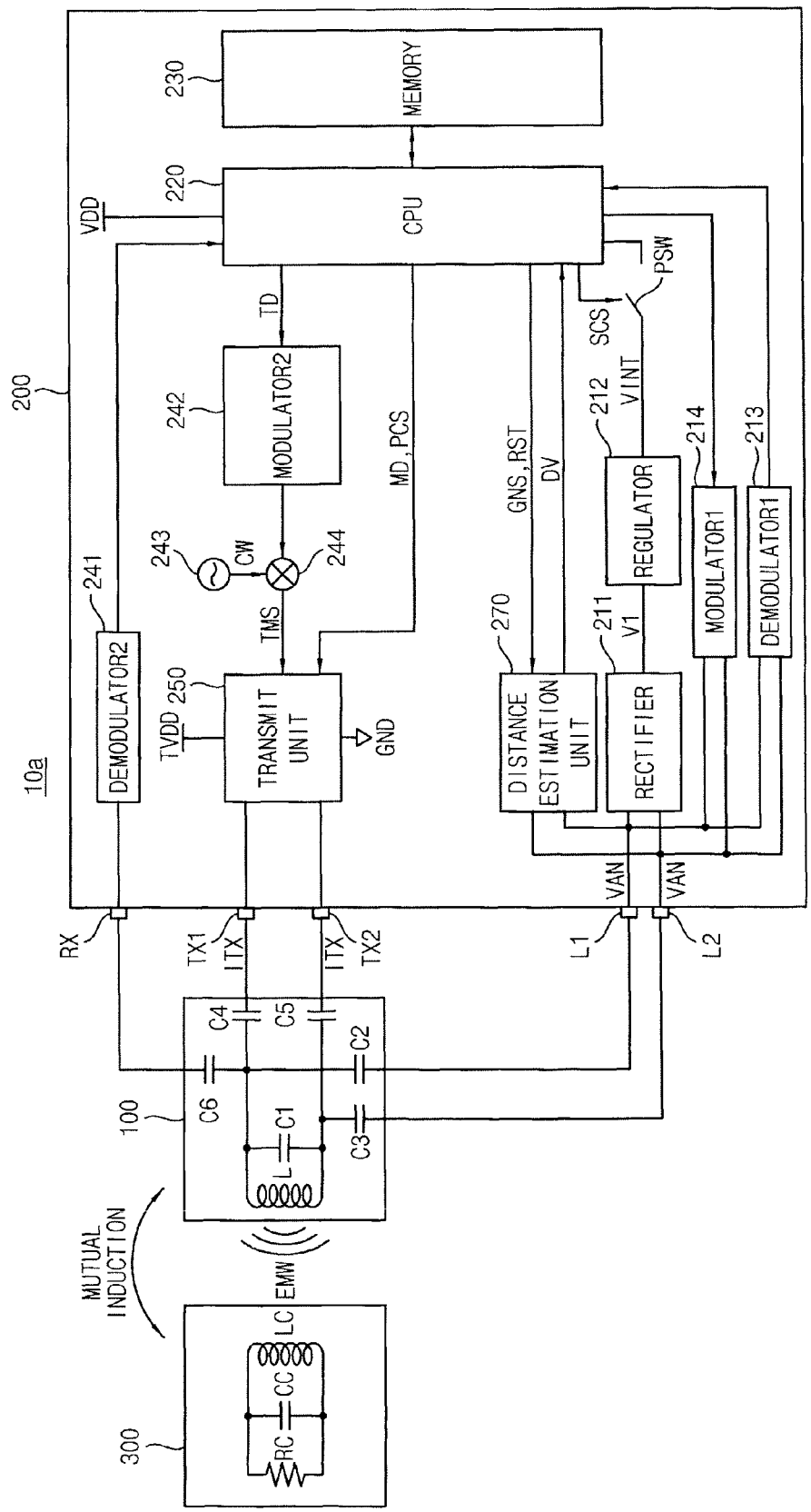

FIGS. 12 and 13 are diagrams used to describe an operation of the NFC device of FIG. 2 to detect whether an NFC card is near the NFC device.

In FIG. 12, the x-axis represents time and the y-axis represents the antenna voltage VAN generated by the resonance unit 100.

As illustrated in FIG. 12, to detect whether an NFC card is near the NFC device 10a, the transmit unit 250 may periodically provide the output current ITX corresponding to the carrier signal CW to the resonance unit 100, and the resonance unit 100 may periodically emit the electromagnetic wave EMW corresponding to the output current ITX.

When an NFC card is not near the NFC device 10a, a mutual induction does not occur at the resonance unit 100, and a voltage of the resonance circuit included in the resonance unit 100 is maintained as the standard voltage Vs. Therefore, as illustrated in FIG. 12, the antenna voltage VAN provided by the resonance unit 100 to the distance estimation unit 270 while the resonance unit 100 emits the electromagnetic wave EMW may be substantially the same as the standard voltage Vs.

As illustrated in FIGS. 12 and 13, when an NFC card 300, which includes a resonance circuit that includes an antenna LC having an inductance component, a resonance capacitor CC and a resistor RC, approaches the NFC device 10a at a first time t1, a mutual induction occurs between the resonance unit 100 and the NFC card 300, and the antenna voltage VAN decreases below the standard voltage Vs.

Therefore, the CPU 220 may determine that the NFC card 300 is detected near the NFC device 10a when the voltage corresponding to the digital value DV received from the distance estimation unit 270 is lower than the standard voltage Vs by an amount Vd greater than the second threshold voltage Vth2.

When the NFC device 10a detects the NFC card 300 near the NFC device 10a, the NFC device 10a may operate in the reader mode. In the reader mode, the transmit unit 250 may continuously provide the output current ITX to the resonance unit 100, and the resonance unit 100 may continuously emit the electromagnetic wave EMW corresponding to the output current ITX.

The distance estimation unit 270 may periodically convert the antenna voltage VAN received from the resonance unit 100 to the digital value DV.

When the distance between the NFC device 10a and the NFC card 300 decreases, a relatively strong mutual induction may occur between the resonance unit 100 and the NFC card 300 such that the antenna voltage VAN decreases, and as a result, the digital value DV decreases. When the distance between the NFC device 10a and the NFC card 300 increases, a relatively weak mutual induction may occur between the resonance unit 100 and the NFC card 300 such that the antenna voltage VAN increases, and as a result, the digital value DV increases. As a result, the CPU 220 may estimate the distance between the NFC device 10a and the NFC card 300 based on the digital value DV.

Therefore, when the digital value DV decreases, the CPU 220 may determine that the distance between the NFC device 10a and the NFC card 300 has decreased, and may decrease the magnitude of the power control signal PCS. Alternatively, when the digital value DV increases, the CPU 220 may determine that the distance between the NFC device 10a and the NFC card 300 has increased, and may increase the magnitude of the power control signal PCS. The transmit unit 250 may decrease the magnitude of the output current ITX when the magnitude of the power control signal PCS decreases, and may increase the magnitude of the output current ITX when the magnitude of the power control signal PCS increases.

As described above, the CPU 220 may estimate the distance between the NFC device 10a and the NFC card 300 and generate the power control signal PCS based on the estimated distance, and the transmit unit 250 may optimize the magnitude of the electromagnetic wave EMW, which is emitted from the resonance unit 100, by adjusting the magnitude of the output current ITX, which is provided to the resonance unit 100, based on the power control signal PCS. As a result, power consumption of the NFC device 10a may be reduced.

Figure 14:
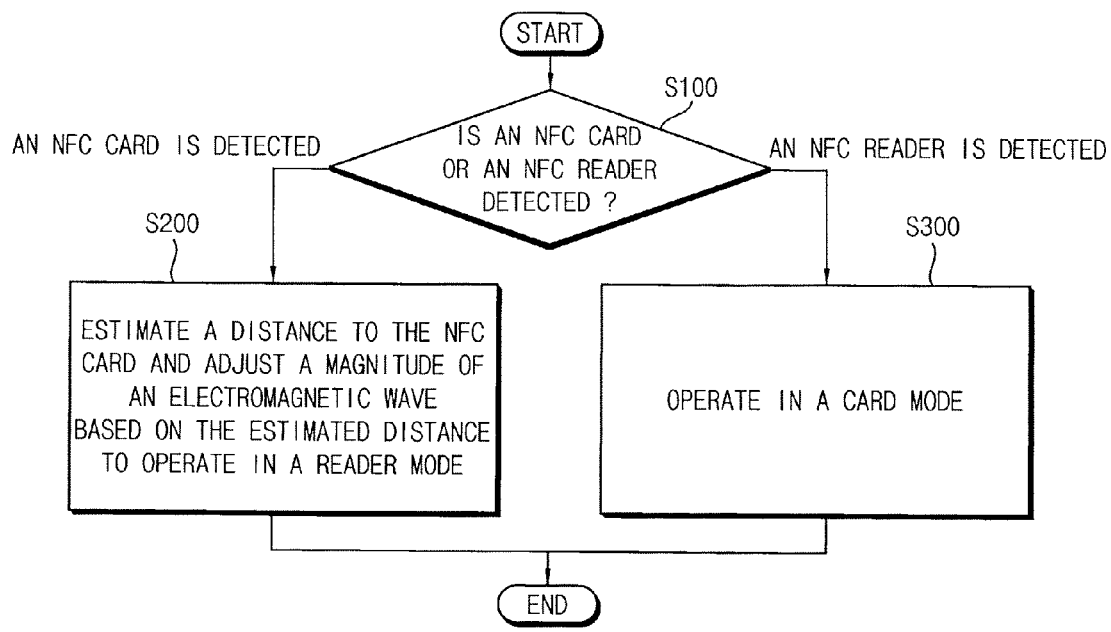
FIG. 14 is a flowchart illustrating a method of controlling power in an NFC device according to exemplary embodiments of the present invention.

FIG. 14 is a flowchart illustrating a method of controlling power in an NFC device according to exemplary embodiments of the present invention.

The NFC device performing the method of FIG. 14 includes a resonance unit, which emits an electromagnetic wave to communicate (e.g., transmit and receive) data with an external device, and an NFC chip controlling the resonance unit. The resonance unit includes a resonance circuit that includes an antenna having an inductance component and a resonance capacitor. The NFC device performing the method of FIG. 14 may be, for example, the NFC device 10 of FIG. 1.

Referring to FIG. 14, in a method of controlling power in the NFC device, whether an NFC card or an NFC reader is near the NFC device is detected (S100).

Figure 15:
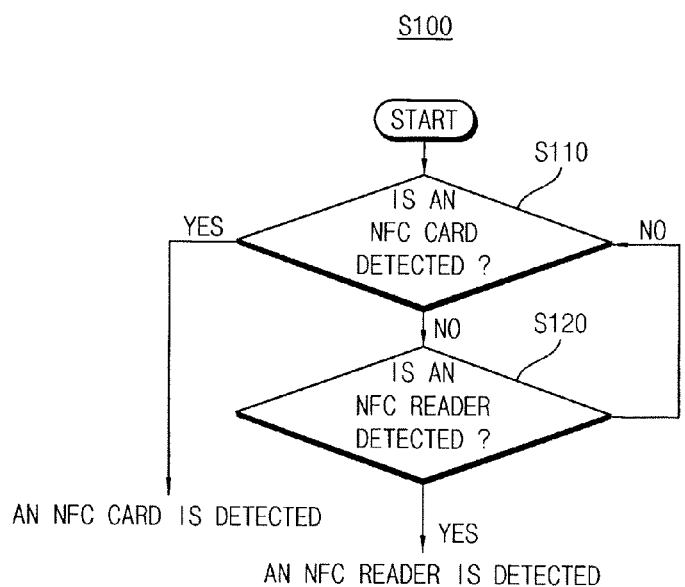
FIG. 15 is a flowchart illustrating an example of detecting whether an NFC card or an NFC reader is near the NFC device of FIG. 14 according to an exemplary embodiment of the present invention.

FIG. 15 is a flowchart illustrating an example of detecting whether an NFC card or an NFC reader is near the NFC device of FIG. 14 according to an exemplary embodiment of the present invention.

Referring to FIG. 15, when the NFC device turns on, the NFC device alternately performs an operation of detecting whether an NFC card is near the NFC device (S110) and an operation of detecting whether an NFC reader is near the NFC device (S120) until the NFC device detects one of an NFC card and an NFC reader.

In exemplary embodiments, to detect whether an NFC reader is near the NFC device, the NFC device may periodically measure a voltage generated by the resonance unit in response to an electromagnetic wave, and may determine that an NFC reader is detected near the NFC device when the measured voltage is higher than a first threshold voltage.

In exemplary embodiments, to detect whether an NFC card is near the NFC device, the NFC device may periodically emit an electromagnetic wave and determine that an NFC card is detected near the NFC device when a voltage generated by the resonance unit while the resonance unit emits the electromagnetic wave decreases by an amount greater than a second threshold voltage.

Referring again to FIG. 14, when the NFC device detects the NFC reader near the NFC device, the NFC device may operate in the card mode (S300).

When the NFC device detects the NFC card near the NFC device, the NFC device may operate in the reader mode (S200). In the reader mode, the NFC device estimates a distance between the NFC device and the NFC card based on an antenna voltage generated by the resonance unit while the resonance unit continuously emits the electromagnetic wave to the NFC card, and adjusts a magnitude of the electromagnetic wave based on the estimated distance.

Figure 16:
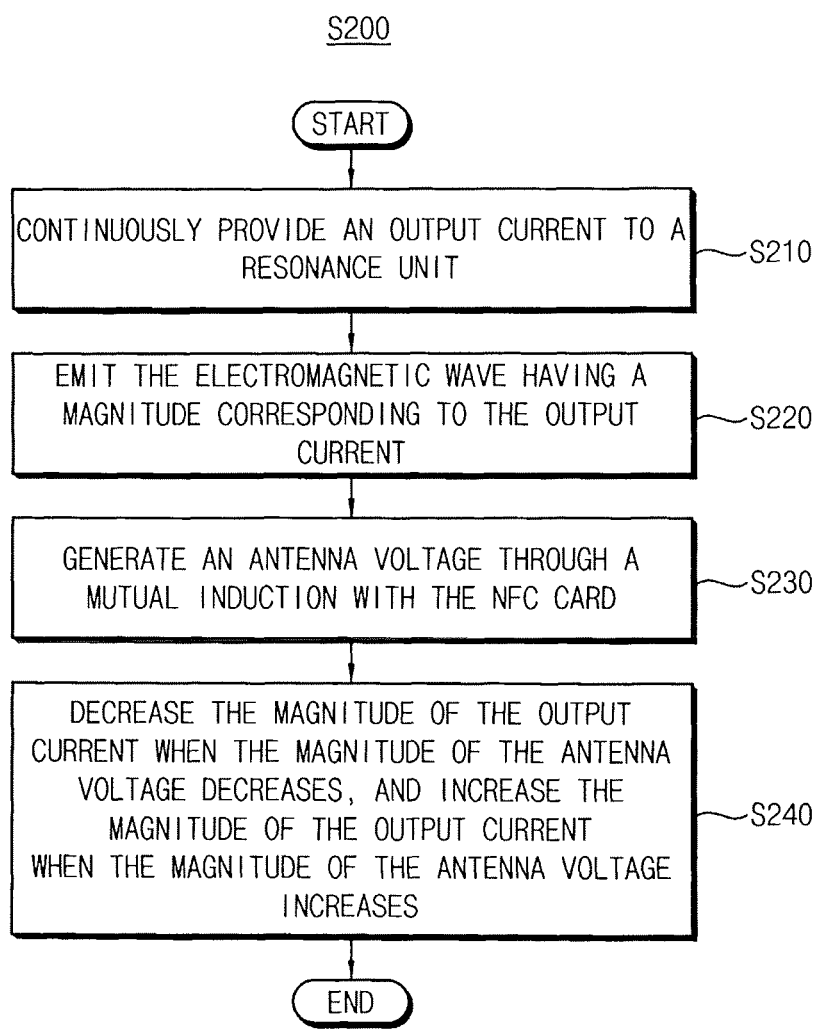
FIG. 16 is a flowchart illustrating an example of operating in a reader mode of FIG. 14 according to an exemplary embodiment of the present invention.

FIG. 16 is a flowchart illustrating an example of operating in a reader mode of FIG. 14 according to an exemplary embodiment of the present invention.

Referring to FIG. 16, the NFC chip may continuously provide an output current to the resonance unit (S210), and the resonance unit may emit the electromagnetic wave having a magnitude corresponding to the output current (S220). The resonance unit may generate the antenna voltage through a mutual induction with the NFC card (S230) while the resonance unit emits the electromagnetic wave. The NFC chip may periodically measure the antenna voltage such that the NFC chip may decrease the magnitude of the output current when the magnitude of the antenna voltage decreases, and increase the magnitude of the output current when the magnitude of the antenna voltage increases (S240).

The method of controlling power in an NFC device described above with reference to FIGS. 14 to 16 may be performed by the NFC device 10 of FIG. 1. The structure and operation of the NFC device 10 of FIG. 1 is described above with reference to FIGS. 1 to 13.

Figure 17:
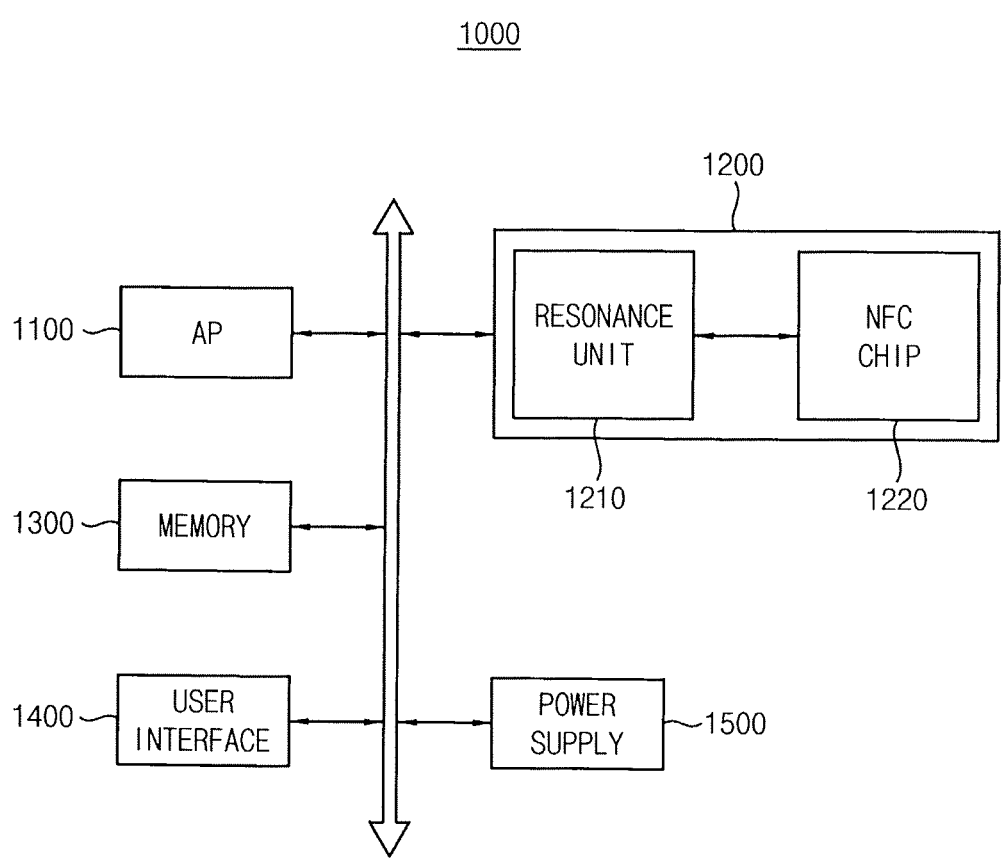
FIG. 17 is a block diagram illustrating an electronic system according to an exemplary embodiment of the present invention.

FIG. 17 is a block diagram illustrating an electronic system according to an exemplary embodiment of the present invention.

Referring to FIG. 17, an electronic system 1000 includes an application processor AP 1100, an NFC device 1200, a memory device 1300, a user interface 1400, and a power supply 1500. In exemplary embodiments, the electronic system 1000 may be, for example, arbitrary mobile systems, such as a mobile phone, a smartphone, a personal digital assistant (PDA), a portable multimedia player (PMP), a digital camera, a camcorder, a music player, a portable game console, a navigation system, etc.

The application processor 1100 controls overall operations of the electronic system 1000. The application processor 1100 may execute applications such as, for example, a web browser, a game application, a video player, etc. In exemplary embodiments, the application processor 1100 may include a single core or multiple cores. For example, the application processor 1100 may be a multi-core processor, such as a dual-core processor, a quad-core processor, a hexa-core processor, etc. The application processor 1100 may include an internal or external cache memory.

The memory device 1300 stores various data. For example, the memory device 1300 may store a boot image for booting the electronic system 1000. In exemplary embodiments, the memory device 1300 may be, for example, an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The NFC device 1200 transmits output data stored in the memory device 1300 to an external device through NFC. The NFC device 1200 receives input data from the external device through NFC and stores the input data in the memory device 1300. The NFC device 1200 includes a resonance unit 1210 and an NFC chip 1220. The resonance unit 1210 emits an electromagnetic wave in a reader mode to transmit the output data to the external device and to receive the input data from the external device. The resonance unit 1210 may generate an antenna voltage through a mutual induction with the external device while the resonance unit 1210 emits the electromagnetic wave. The NFC chip 1220 estimates a distance to the external device based on the antenna voltage generated by the resonance unit 1210 while the resonance unit 1210 emits the electromagnetic wave, and adjusts a magnitude of the electromagnetic wave based on the estimated distance. For example, the NFC chip 1220 may provide an output current to the resonance unit 1210, the resonance unit 1210 may emit the electromagnetic wave having a magnitude corresponding to the output current, and the NFC chip 1220 may measure the antenna voltage while the resonance unit 1210 emits the electromagnetic wave, decrease the magnitude of the output current when the magnitude of the antenna voltage decreases, and increase the magnitude of the output current when the magnitude of the antenna voltage increases. The NFC device 1200 may be implemented with the NFC device 10 of FIG. 1. The structure and operation of the NFC device 10 of FIG. 1 are described above with reference to FIGS. 1 to 13. Therefore, a detailed description of the NFC device 1200 will be omitted.

The user interface 1400 may include at least one input device such as, for example, a keypad, a touchscreen, etc., and at least one output device such as, for example, a speaker, a display device, etc. The power supply 1500 may supply a power supply voltage to the electronic system 1000.

In exemplary embodiments, the electronic system 1000 may further include, for example, an image processor and/or a storage device such as, for example, a memory card, a solid state drive (SSD), a hard disk drive (HDD), a CD-ROM, etc.

In exemplary embodiments, the electronic system 1000 and/or components of the electronic system 1000 may be packaged in various forms such as, for example, package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A near field communication (NFC) device, comprising:
a resonance unit configured to emit an electromagnetic wave to communicate data with an external card in a reader mode; and
an NFC chip configured to estimate a distance between the NFC device and the external card based on an antenna voltage generated by the resonance unit while the resonance unit emits the electromagnetic wave, and configured to adjust a magnitude of the electromagnetic wave based on the estimated distance,
wherein the NFC chip is configured to provide an output current to the resonance unit, the resonance unit is configured to emit the electromagnetic wave, wherein the magnitude of the electromagnetic wave corresponds to the output current, and the NFC chip is configured to measure the antenna voltage while the resonance unit emits electromagnetic wave and adjust a magnitude of the output current based on a magnitude of the antenna voltage,
wherein the NFC chip comprises:
a transmit unit configured to provide the output current to the resonance unit through a transmission electrode, wherein the magnitude of the output current corresponds to a power control signal;
a distance estimation unit configured to receive the antenna voltage from the resonance unit through a power electrode, and configured to convert the antenna voltage to a digital value; and
a central processing unit (CPU) configured to detect whether the external card is near the resonance unit based on the digital value, and configured to generate the power control signal based on the digital value in response to the external card being detected near the resonance unit,
wherein the transmit unit comprises:
a voltage generation unit configured to generate a transmission supply voltage based on a first power control signal, wherein the power control signal includes the first power control signal and a second power control signal;

first through n-th pull-up transistors coupled in parallel between the transmission supply voltage and the transmission electrode, wherein n is an integer equal to or greater than two;
first through n-th pull-down transistors coupled in parallel between a ground voltage and the transmission electrode; and
a driving unit configured to select k pull-up transistors and k pull-down transistors from among the first through n-th pull-up transistors and the first through n-th pull-down transistors based on the second power control signal,
wherein the driving unit is further configured to turn off the first through n-th pull-down transistors and unselected (n-k) pull-up transistors and turn on the selected k pull-up transistors, or turn off the first through n-th pull-up transistors and the unselected (n-k) pull-down transistors and turn on the selected k pull-down transistors based on output data, wherein k is a positive integer equal to or less than n.

2. The NFC device of claim 1, wherein the resonance unit is configured to generate the antenna voltage through a mutual induction with the external card while the resonance unit emits the electromagnetic wave.

3. The NFC device of claim 1, wherein the NFC chip is configured to decrease the magnitude of the output current in response to the magnitude of the antenna voltage decreasing, and increase the magnitude of the output current in response to the magnitude of the antenna voltage increasing.

4. The NFC device of claim 1, wherein the NFC chip is configured to measure the antenna voltage while the NFC chip periodically provides the output current to the resonance unit, and detect whether the external card is near the resonance unit based on a decrease amount of the antenna voltage.

5. The NFC device of claim 1, wherein the transmit unit is configured to periodically provide the output current to the resonance unit through the transmission electrode, the distance estimation unit is configured to convert the antenna voltage received from the resonance unit through the power electrode to the digital value while the resonance unit emits the electromagnetic wave, and the CPU is configured to determine that the external card is detected near the resonance unit in response to a voltage corresponding to the digital value being lower than a standard voltage by at least a threshold voltage.

6. The NFC device of claim 5, wherein the transmit unit is configured to continuously provide the output current to the resonance unit, the distance estimation unit is configured to periodically convert the antenna voltage to the digital value, and the CPU is configured to adjust a magnitude of the power control signal based on the digital value while the external card is detected as being near the resonance unit.

7. The NFC device of claim 1, wherein the CPU is configured to decrease the power control signal in response to the digital value decreasing, and increase the power control signal in response to the digital value increasing, and
wherein the voltage generation unit is configured to decrease the transmission supply voltage in response to the power control signal decreasing, and increase the transmission supply voltage in response to the power control signal increasing.

8. The NFC device of claim 1, wherein the CPU is configured to decrease the power control signal in response to the digital value decreasing, and increase the power control signal in response to the digital value increasing, and wherein the driving unit is configured to decrease a number of the selected pull-up transistors and a number of the selected pull-down transistors in response to the power control signal decreasing, and increase the number of the selected pull-up transistors and the number of the selected pull-down transistors in response to the power control signal increasing.

9. The NFC device of claim 1, wherein the CPU is configured to decrease at least one of the first power control signal and the second power control signal in response to the digital value decreasing, and increase at least one of the first power control signal and the second power control signal in response to the digital value increasing,
wherein the voltage generation unit is configured to decrease the transmission supply voltage in response to the first power control signal decreasing, and increase the transmission supply voltage in response to the first power control signal increasing, and
wherein the driving unit is configured to decrease a number of the selected pull-up transistors and a number of the selected pull-down transistors in response to the second power control signal decreasing, and increase the number of the selected pull-up transistors and the number of the selected pull-clown transistors in response to the second power control signal increasing.

10. The NFC device of claim 1, wherein the distance estimation unit comprises:
a sensing unit configured to generate a direct voltage proportional to the magnitude of the antenna voltage and a gain signal; and
an analog-to-digital conversion unit configured to generate the digital value by performing an analog-to-digital conversion process on the direct voltage.

11. The NFC device of claim 10, wherein the CPU is configured to provide the gain signal having a first value to the sensing unit in the reader mode, and provide the gain signal having a second value greater than the first value to the sensing unit in a card mode.

12. The NFC device of claim 10, wherein the analog-to-digital conversion unit comprises:
a counting unit configured to generate a counting value by performing an up-counting operation;
a scanning voltage generation unit configured to generate a scanning voltage sequentially increasing based on the counting value;
a comparator configured to output a comparison signal having a first logic level while the direct voltage is greater than the scanning voltage, and a second logic level while the direct voltage is equal to or less than the scanning voltage; and
a latch unit configured to store the counting value as the digital value in response to a transition of the comparison signal.

13. An electronic system, comprising:
a near field communication (NFC) device configured to communicate with an external device through NFC;
a memory device configured to store output data and input data; and
an application processor configured to control operations of the NFC device and the memory device,
wherein the NFC device comprises:
a resonance unit configured to emit an electromagnetic wave to transmit the output data to the external device and to receive the input data from the external device in a reader mode; and
an NFC chip configured to estimate a distance between the resonance unit and the external device based on an antenna voltage generated by the resonance unit while the resonance unit emits the electromagnetic wave, and configured to adjust a magnitude of the electromagnetic wave based on the estimated distance, wherein the NFC chip is configured to provide an output current to resonance unit, the resonance unit is configured to emit the electromagnetic wave wherein the magnitude of the electromagnetic wave corresponds to the output current, and the NFC chip is configured to measure the antenna voltage while the resonance unit emits the electromagnetic wave and adjust a magnitude of the output current based on a magnitude of the antenna voltage, wherein the NFC chip comprises:

a transmit unit configured to provide the output current to the resonance unit through a transmission electrode, wherein the magnitude of the output current corresponds to a power control signal;

a distance estimation unit configured to receive the antenna voltage from the resonance unit through a power electrode, and configured to convert the antenna voltage to a digital value; and a central processing unit (CPU) configured to detect whether the external device is near the resonance unit based on the digital value, and configured to generate the power control signal based on the digital value in response to the external device being detected near the resonance unit, wherein the transmit unit comprises:

a voltage generation unit configured to generate a transmission supply voltage based on a first power control signal, wherein the power control signal includes the first power control signal and a second power control signal;

first through n-th pull-up transistors coupled in parallel between the transmission supply voltage and the transmission electrode, wherein n is an integer equal to or greater than two;

first through n-th pull-down transistors coupled in parallel between the ground voltage and the transmission electrode; and a driving unit configured to select k pull-up transistors and k pull-down transistors from among the first through n-th pull-up transistors and the first through n-th pull-down transistors based on the second power control signal, wherein the driving unit is further configured to turn off the first through n-th pull-down transistors and unselected (n-k) pull-up transistors and turn on the selected k pull-up transistors, or turn off the first through n-th pull-up transistors and the unselected (n-k) pull-down transistors and turn on the selected k pull-down transistors based on output data, wherein k is a positive integer equal to or less than n.

14. The electronic system of claim 13, wherein the resonance unit is configured to generate the antenna voltage through a mutual induction with the external device while the resonance unit emits the electromagnetic wave.

* * * * *